United States Patent
Glover et al.

(10) Patent No.: US 10,146,879 B2
(45) Date of Patent: Dec. 4, 2018

(54) GENERATING SOFTWARE APPLICATION SEARCH RESULTS USING APPLICATION CONNECTION KEYWORDS

(71) Applicant: Samsung Electronics Co., Ltd., Suwon-si, Gyeonggi-do (KR)

(72) Inventors: Eric Glover, Palo Alto, CA (US); Gilead Mark, Palo Alto, CA (US); Manikandan Sankaranarasimhan, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 14/967,161

(22) Filed: Dec. 11, 2015

(65) Prior Publication Data
US 2017/0169023 A1  Jun. 15, 2017

(51) Int. Cl.
*G06F 17/00* (2006.01)
*G06F 17/30* (2006.01)

(52) U.S. Cl.
CPC ............... *G06F 17/30867* (2013.01)

(58) Field of Classification Search
CPC ......... G06F 17/30554; G06F 17/30867; G06F 17/3053; G06F 3/0482; G06F 17/30864
See application file for complete search history.

(56) References Cited

U.S. PATENT DOCUMENTS

| | | | |
|---|---|---|---|
| 8,868,590 B1 | 10/2014 | Donneau-Golencer | |
| 2011/0055699 A1 | 3/2011 | Li et al. | |
| 2011/0179119 A1 | 7/2011 | Penn | |
| 2012/0209847 A1 | 8/2012 | Rangan | |
| 2012/0221558 A1 | 8/2012 | Byrne et al. | |
| 2013/0117219 A1 | 5/2013 | Malka et al. | |
| 2013/0218596 A1 | 8/2013 | Gome et al. | |
| 2014/0053261 A1 | 2/2014 | Gupta et al. | |
| 2014/0199664 A1 | 7/2014 | Sadeh-Koniecpol et al. | |
| 2014/0214610 A1 | 7/2014 | Moshir et al. | |
| 2016/0162555 A1* | 6/2016 | Shapira | G06F 17/30554 707/722 |
| 2017/0169022 A1 | 6/2017 | Mark et al. | |
| 2017/0171292 A1 | 6/2017 | Mark et al. | |

OTHER PUBLICATIONS

U.S. Appl. No. 14/957,148, filed Dec. 11, 2015, Gilead Mark.
U.S. Appl. No. 14/967,171, filed Dec. 11, 2015, Gilead Mark.

* cited by examiner

*Primary Examiner* — Truong V Vo
(74) *Attorney, Agent, or Firm* — Jefferson IP Law, LLP

(57) ABSTRACT

Techniques include, for an application (app) record specifying a software app and including an app download address (ADA) for downloading the app, determining connections (e.g., links to and from other resources, such as other apps, APIs, app libraries, and websites) associated with the app and determining terms (e.g., keywords) associated with resources connected with the app by the connections. In some examples, the techniques include receiving a search query from a user device and identifying the record based on (e.g., matches between) the query and the terms. Additionally, or alternatively, the techniques include identifying the record based on the search query, generating a result score for the record based on the terms, and selecting the record from among other records based on the score. The techniques also include selecting the ADA from the record and transmitting the ADA to the user device as search results.

20 Claims, 14 Drawing Sheets

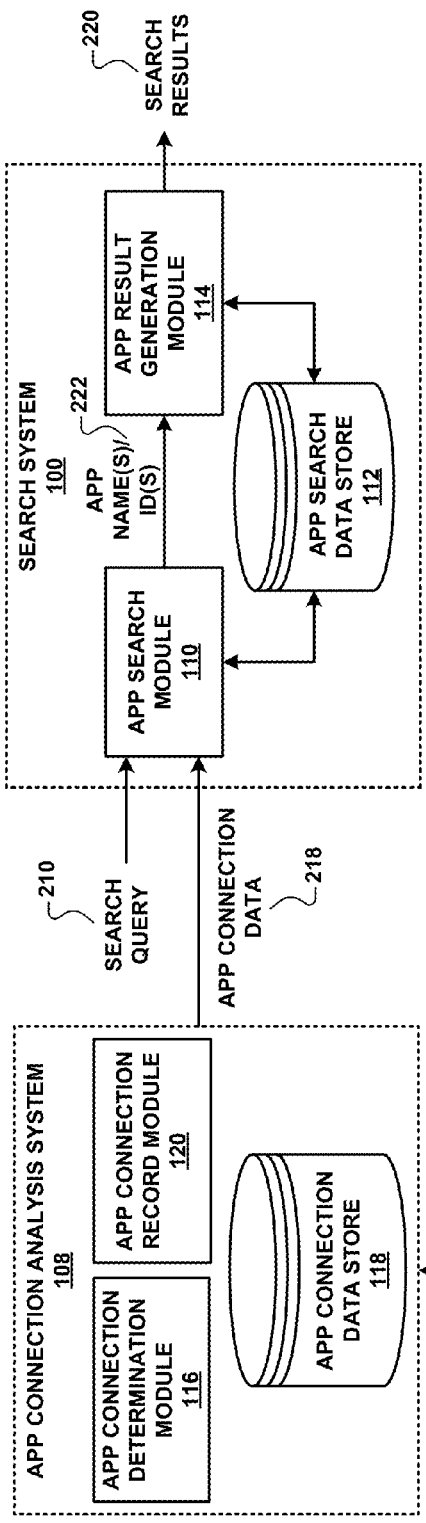
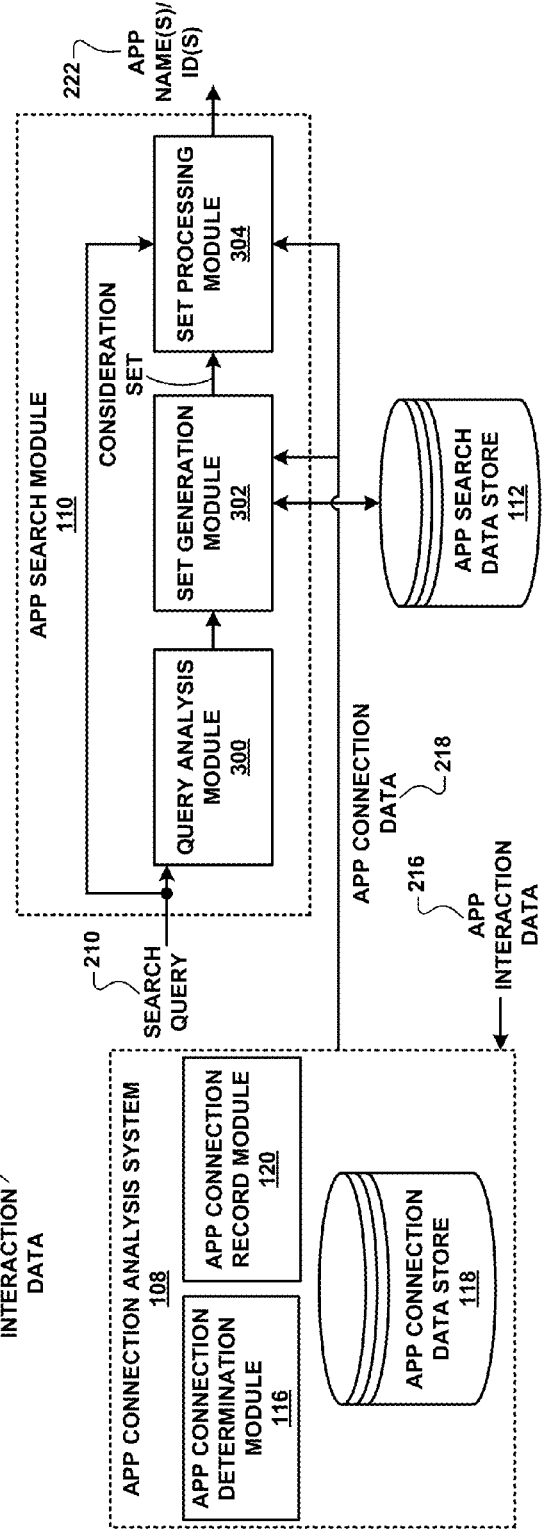
FIG. 3A
FIG. 3B

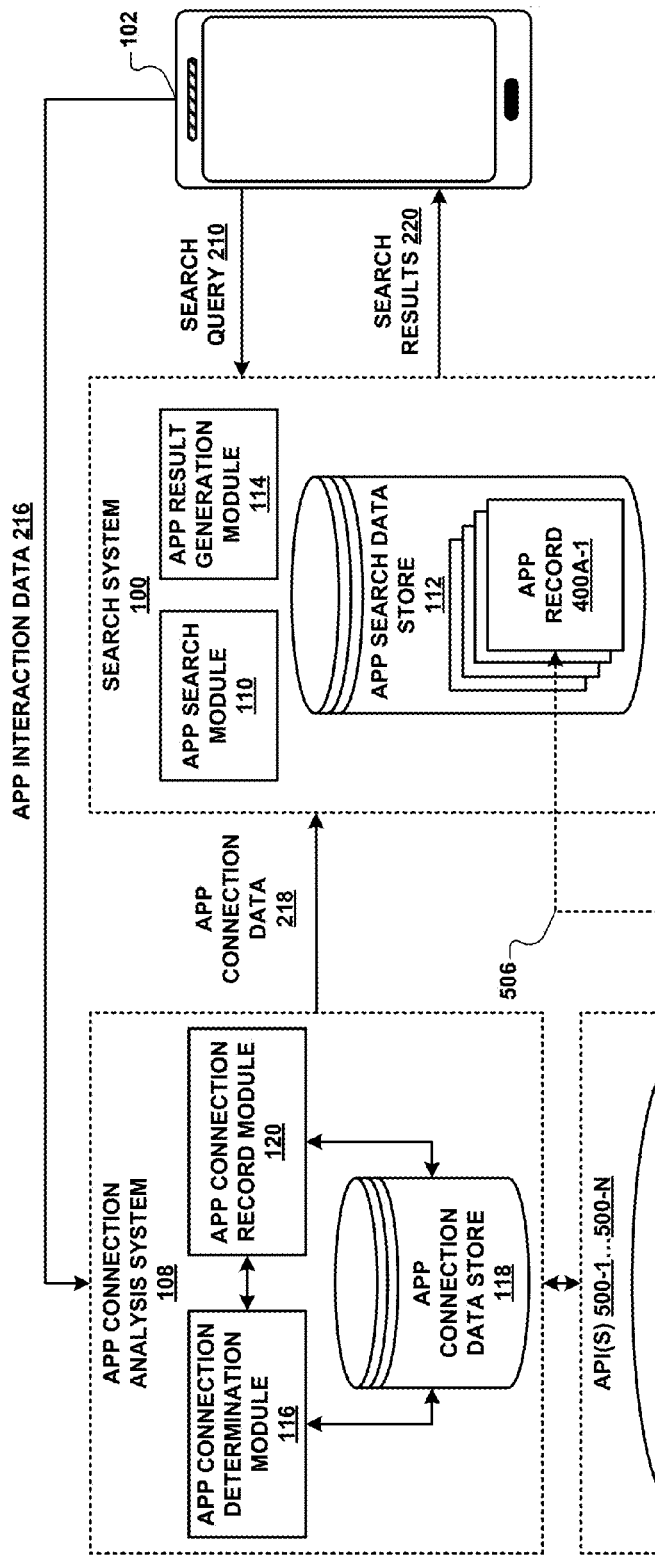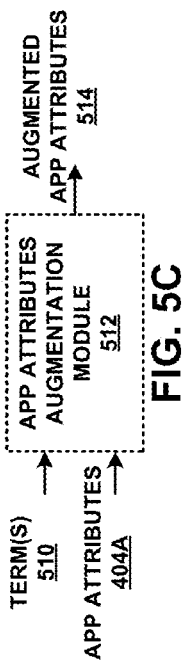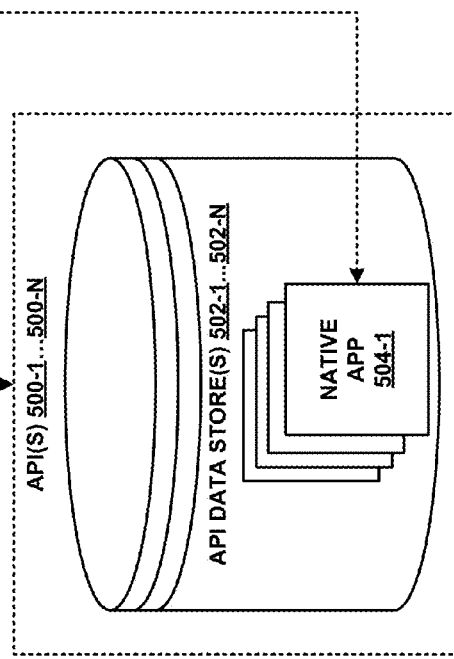

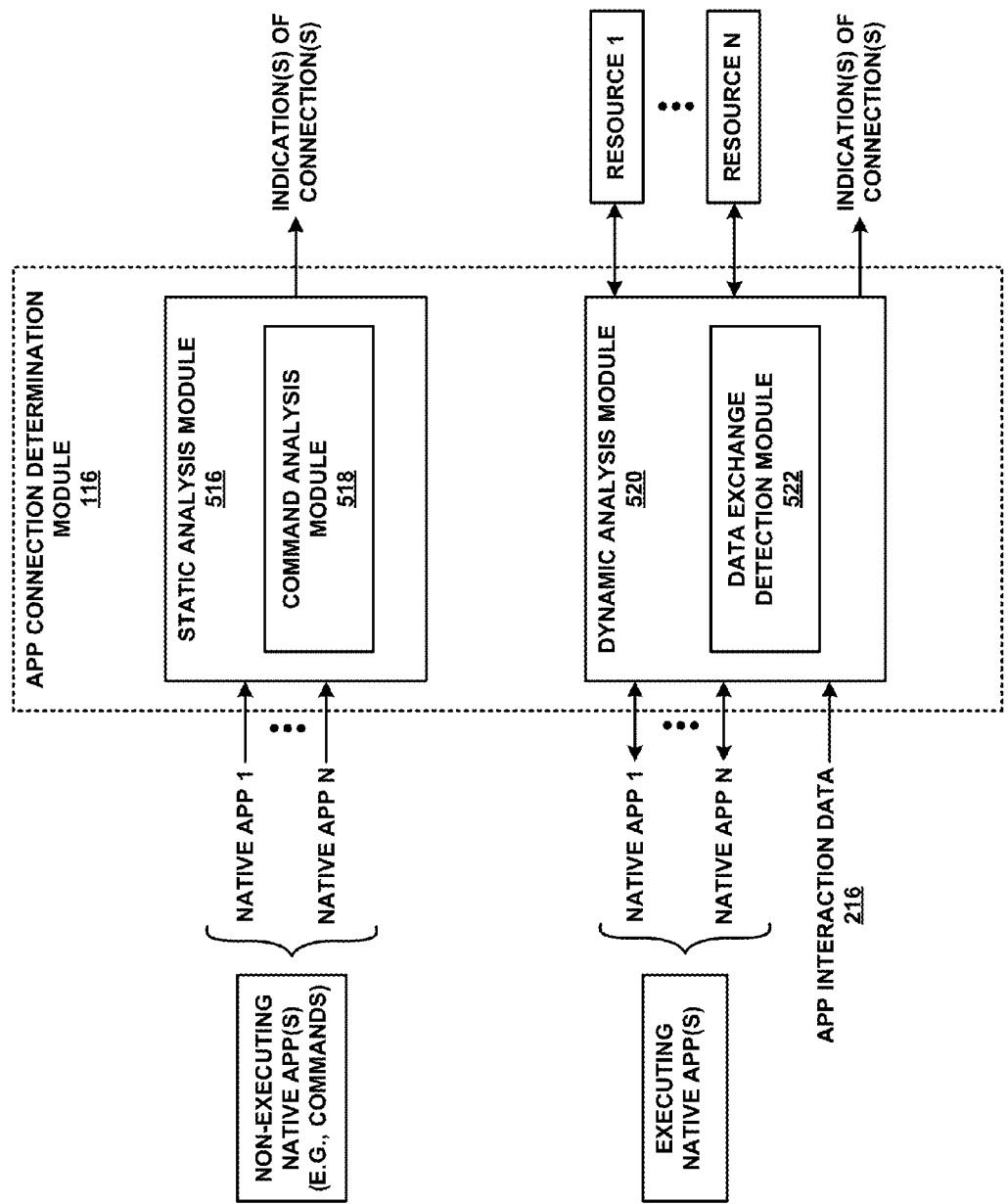

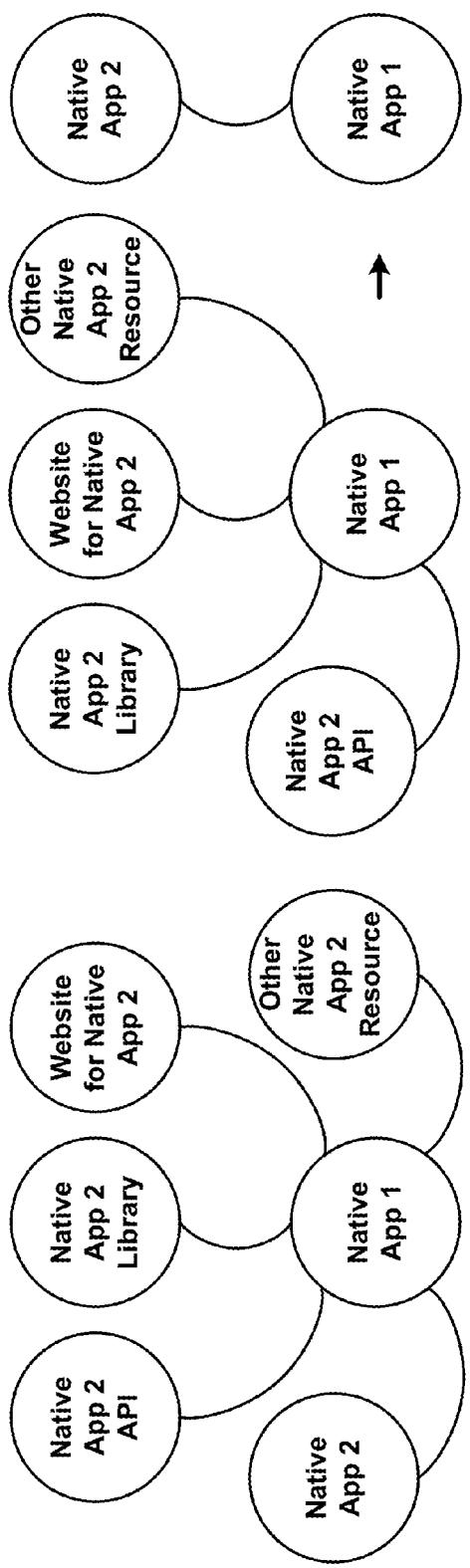
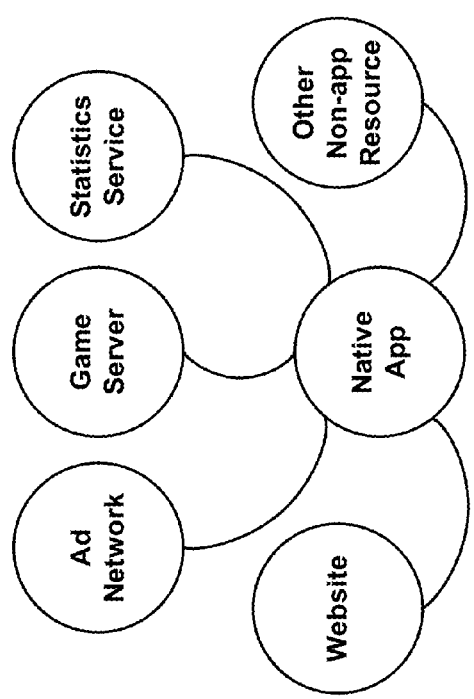
FIG. 6A
FIG. 6B
FIG. 6C

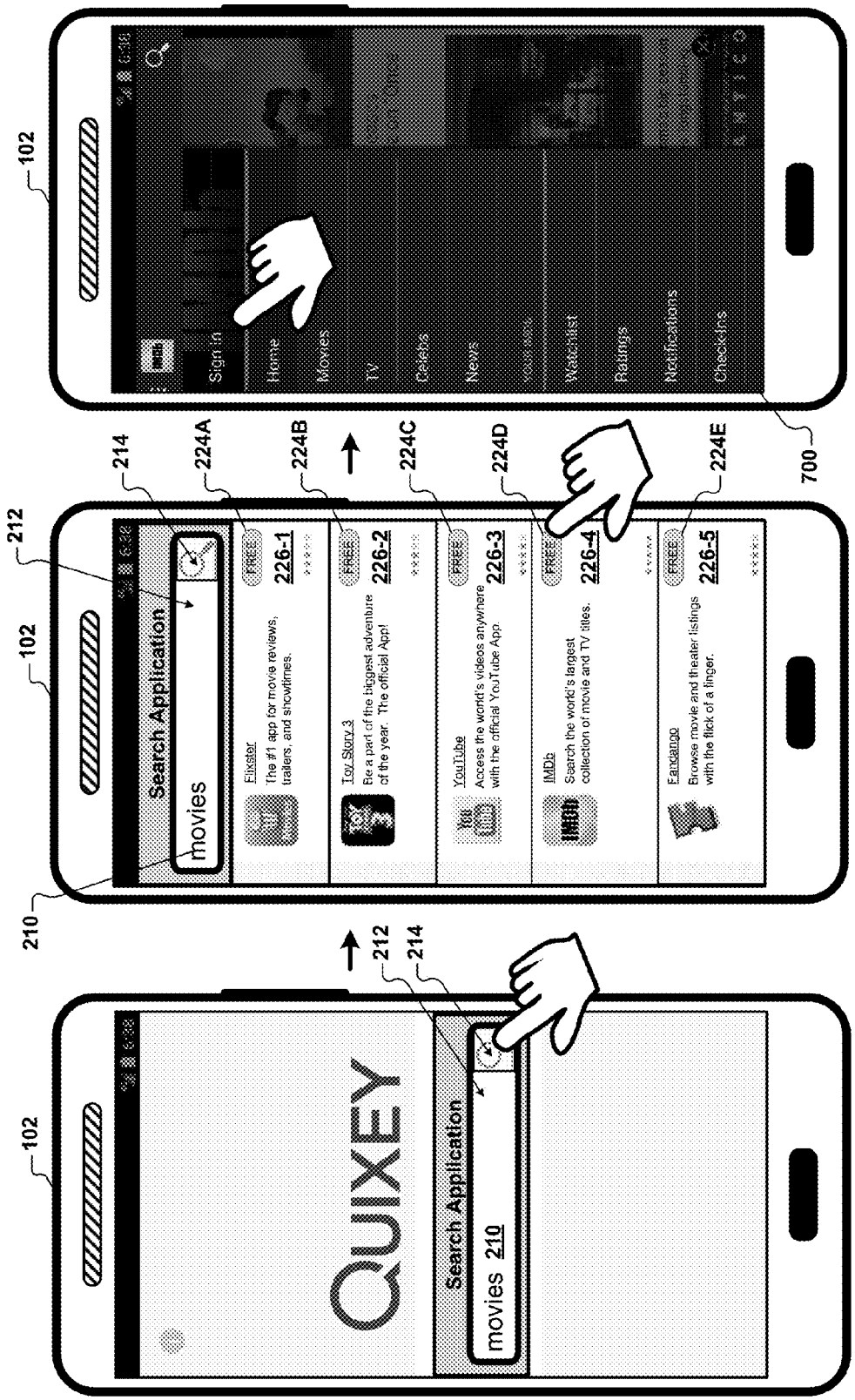

GENERATING SOFTWARE APPLICATION SEARCH RESULTS USING APPLICATION CONNECTION KEYWORDS

TECHNICAL FIELD

This disclosure generally relates to the field of software applications (apps), and more particularly to techniques for performing searches for apps.

BACKGROUND

In recent years, the use of computers, smartphones, and other Internet-connected computing devices has grown significantly. Correspondingly, the number of software applications (apps) available for such computing devices has also grown. Today, many diverse software apps can be accessed on a number of different computing devices, including, but not limited to, smartphones, personal computers, automobiles, and televisions. These software apps can include business driven apps, games, educational apps, news apps, shopping apps, messaging apps, media streaming apps, and social networking apps, as some examples. Because of the large number of software apps available today and the wide range of functionality they provide, computing device users often require the ability to search for and access specific software apps.

SUMMARY

In one example, a method includes, for each of a plurality of application (app) records each specifying a native app and including an app download address (ADA) for downloading the app, determining one or more connections associated with the app and determining one or more terms associated with one or more resources connected with the app by the connections. The method further includes receiving a search query from a user device and identifying one or more of the plurality of app records based on the query and based on the terms determined for each identified record. The method also includes selecting the one or more ADAs from the identified app records and transmitting the ADAs to the user device.

In another example, a method includes, for each of a plurality of app records each specifying a native app and including an ADA for downloading the app, determining one or more connections associated with the app and determining one or more terms associated with one or more resources connected with the app by the connections. The method further includes receiving a search query from a user device and identifying one or more of the plurality of app records based on the query. The method still further includes, for each of the identified app records, generating a result score based on the terms determined for the record. The method also includes selecting one or more of the identified app records based on the result score associated with each selected record, selecting the one or more ADAs from the selected records, and transmitting the ADAs to the user device.

In another example, a system includes one or more computing devices configured to, for each of a plurality of app records each specifying a native app and including an ADA for downloading the app, determine one or more connections associated with the app and determine one or more terms associated with one or more resources connected with the app by the connections. The devices are further configured to receive a search query from a user device and identify one or more of the plurality of app records based on the query and based on the terms determined for each identified record. The devices are also configured to select the one or more ADAs from the identified app records and transmit the ADAs to the user device.

In another example, a system includes one or more computing devices configured to, for each of a plurality of app records each specifying a native app and including an ADA for downloading the app, determine one or more connections associated with the app and determine one or more terms associated with one or more resources connected with the app by the connections. The devices are further configured to receive a search query from a user device and identify one or more of the plurality of app records based on the query. The devices are still further configured to, for each of the identified app records, generate a result score based on the terms determined for the record. The devices are also configured to select one or more of the identified app records based on the result score associated with each selected record, select the one or more ADAs from the selected records, and transmit the ADAs to the user device.

In another example, a non-transitory computer-readable storage medium includes instructions that cause one or more computing devices to, for each of a plurality of app records each specifying a native app and including an ADA for downloading the app, determine one or more connections associated with the app and determine one or more terms associated with one or more resources connected with the app by the connections. The instructions further cause the devices to receive a search query from a user device and identify one or more of the plurality of app records based on the query and based on the terms determined for each identified record. The instructions also cause the devices to select the one or more ADAs from the identified app records and transmit the ADAs to the user device.

In another example, a non-transitory computer-readable storage medium includes instructions that cause one or more computing devices to, for each of a plurality of app records each specifying a native app and including an ADA for downloading the app, determine one or more connections associated with the app and determine one or more terms associated with one or more resources connected with the app by the connections. The instructions further cause the devices to receive a search query from a user device and identify one or more of the plurality of app records based on the query. The instructions still further cause the devices to, for each of the identified app records, generate a result score based on the terms determined for the record. The instructions also cause the devices to select one or more of the identified app records based on the result score associated with each selected record, select the one or more ADAs from the selected records, and transmit the ADAs to the user device.

BRIEF DESCRIPTION OF DRAWINGS

The details of one or more examples are set forth in the accompanying drawings and the description below. Other features, objects, and advantages will be apparent from the description and drawings, and from the claims.

FIG. 3A is a functional block diagram of an example search system.

FIG. 3B is a functional block diagram of an example search module.

FIG. 5A illustrates another example user device in communication with an example search system and an example app connection analysis system.

FIG. 5B illustrates an example app term determination module.

FIG. 5C illustrates an example app attributes (AAs) augmentation module.

FIG. 5D illustrates an example app connection determination module.

FIGS. 6A-6D are conceptual diagrams of example connections associated with native apps and an example app connection graph.

FIGS. 7A-7C depict example graphical user interfaces (GUIs) that may be generated on a user device according to the present disclosure.

DETAILED DESCRIPTION

Figure 1:
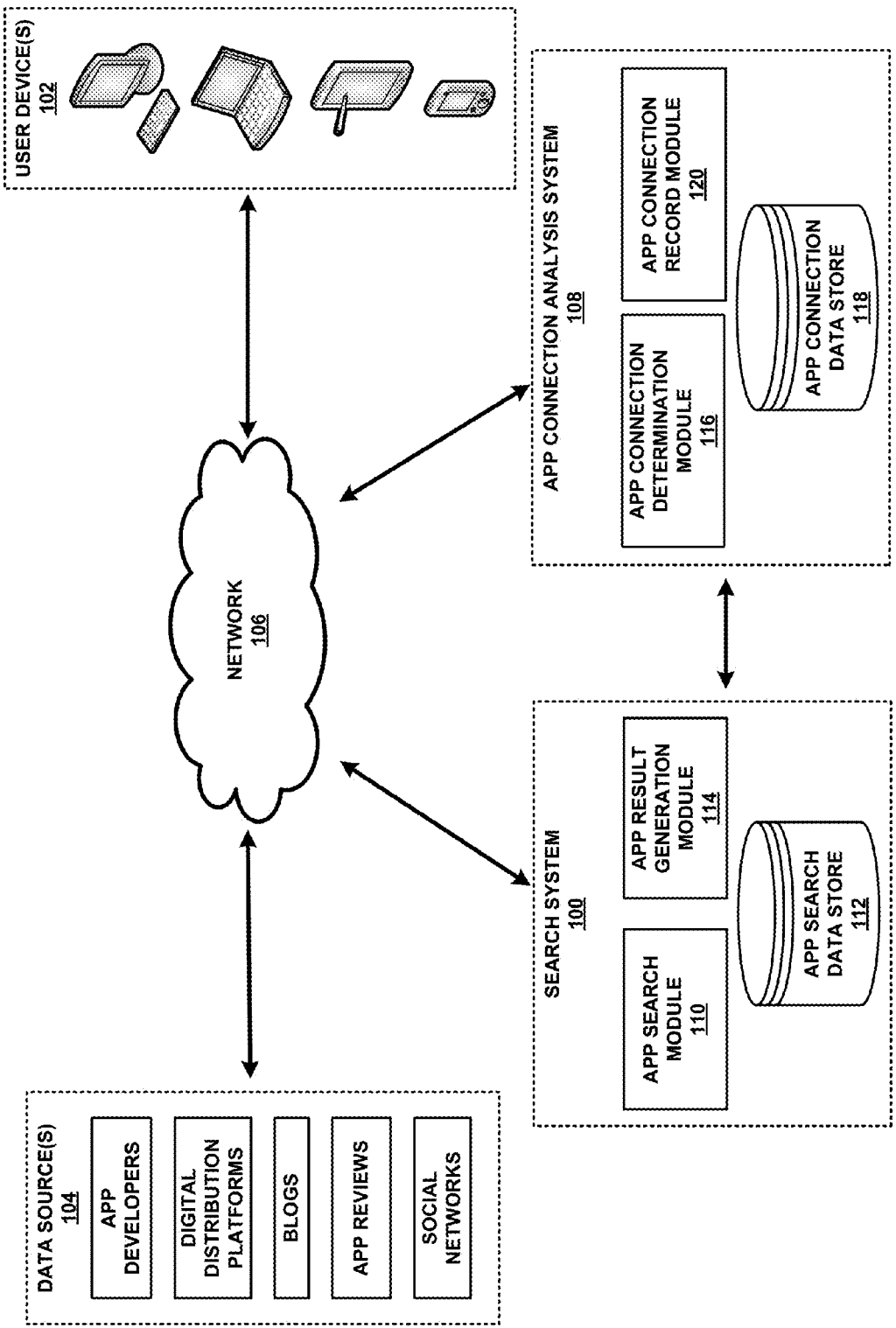
FIG. 1 illustrates an example environment that includes a search system, an application (app) connection analysis system, one or more data sources, and one or more user devices that communicate via a network.

The figures and the following description relate to example implementations by way of illustration only. It should be noted that from the following discussion, alternative implementations of the structures and methods disclosed herein will be readily recognized as viable alternatives that may be employed without departing from the scope of this disclosure.

The present disclosure generally relates to the field of search, and, more particularly, to techniques for generating and displaying search results that specify software applications (apps) based on connections (e.g., links to and from various resources) associated with the apps. In some implementations, the techniques of this disclosure may be used to enable users to perform searches for software apps within digital distribution platforms (e.g., Google Play by Google Inc., the App Store by Apple Inc., Amazon Appstore by Amazon Inc., and Windows Phone Store by Microsoft Corporation) configured to distribute software apps to user devices. In general, the techniques described herein include initially identifying one or more connections (e.g., links) associated with each of one or more software apps included in (e.g., downloadable from) a digital distribution platform. The techniques further include, for each of the software apps, determining one or more terms, or "keywords" (e.g., alphanumeric strings) associated with one or more resources (e.g., other software apps, resources associated with the apps, and/or non-app resources, such as websites) connected with the app by the connections. The techniques also include, in response to receiving a search query from a user device, generating search results that specify one or more of the software apps included in the digital distribution platform based on the query and the terms determined for each app. Using the techniques described herein may, in some examples, improve search result relevance and enhance user experience.

According to the disclosed techniques, a user of a user device (e.g., a mobile computing device) may input a search query (e.g., a text string) into a search field of a search app executing on the device. The user may then cause the user device (e.g., the search app) to transmit the search query to a software app search system (e.g., a digital distribution platform). The search system may receive the search query from the user device, generate search results that each specify a software app using the query, and transmit the results to the device. To generate the search results, the search system may initially generate app connection data that indicates connections associated with software apps specified by app records included in the system. In particular, the search system may, for each app record, determine one or more connections associated with the software app specified by the record. The search system may further determine one or more terms associated with one or more resources connected with the software app by the connections. The search system may then identify one or more of the app records included in the system based on (e.g., matches between) the search query and the terms determined for each identified record. Alternatively, the search system may identify one or more of the app records included in the system based on the search query, in a similar manner as described above. In this example, the search system may further rank (e.g., arrange in an order) the identified app records based on the terms determined for the records and select one or more (e.g., highest-ranking ones) of the ranked records for further consideration.

The search system may generate the search results using the app records identified and/or ranked based on the terms determined for the records. Specifically, the search system may select one or more application download addresses (ADAs) from the app records and generate the search results to include the ADAs and, e.g., other data associated with the records. The search system may then transmit the search results, including the ADAs and, e.g., the other data, to the user device. The user device may receive the search results from the search system and display the results to the user (e.g., as one or more user selectable links). In some examples, the user device may use the other data received from the search system with the search results to display the results to the user (e.g., to generate and/or arrange the user selectable links).

The user may select one or more of the search results (e.g., one or more of the associated user selectable links) on the user device. Upon the user selecting a particular search result (e.g., an associated user selectable link), the user device may download and install the software app specified by the selected result (e.g., by the associated user selectable link). For example, the user device may download the software app from a digital distribution platform using an ADA included in the selected result (e.g., in the associated user selectable link). In some examples, after downloading and installing the software app, the user device may launch the app on the device. Upon the user device launching the software app, the user may interact with the app on the device (e.g., preview and/or perform a function provided by the app).

In this manner, the techniques described herein may improve search result relevance and enhance user experience. In particular, the terms determined for each app record may describe the resources connected with the software app specified by the record via the connections determined for the record. In some examples, the determined terms may also describe one or more various aspects of the software app itself. For example, the terms may describe one or more properties of the software app not described by information included in the app record that specifies the app. Using the terms to identify the app record, as described herein, may result in search results that are more relevant (e.g., useful) to the search query than search results generated using other techniques. Additionally, ranking the identified app record based on the terms, as also described herein, may enable the user to more easily (e.g., quickly) access the most relevant of the search results, thereby enhancing the user's experience.

FIG. 1 illustrates an example environment that includes a search system 100, an app connection analysis system 108 (hereinafter, "analysis system 108"), one or more data sources 104, and one or more user devices 102 that communicate via a network 106. The network 106 through which the above-described systems and devices communicate may include any type of network, such as a local area network (LAN), a wide area network (WAN), and/or the Internet. As shown in FIG. 1, the search system 100 includes an app search module 110 (hereinafter, "search module 110"), an app search data store 112 (hereinafter, "search data store 112"), and an app result generation module 114 (hereinafter, "result generation module 114"), which are described in greater detail herein. As also shown, the analysis system 108 includes an app connection determination module 116 (hereinafter, "connection determination module 116"), an app connection data store 118 (hereinafter, "connection data store 118"), and an app connection record module 120 (hereinafter, "connection record module 120"), which are also described in greater detail herein. In some examples, the analysis system 108 may be a part of the search system 100, a part of another system or device, or a stand-alone system or device.

In this disclosure, a software app may refer to computer software that causes a computing device to perform a task. In some examples, a software app may be referred to as an "app," or a "program." Example apps include word processing apps, spreadsheet apps, messaging apps, media streaming apps, social networking apps, and games. Apps can be executed on a variety of different computing devices. For example, apps can be executed on mobile computing devices, such as smartphones, tablets, and wearable computing devices (e.g., smart watches, fitness bands, and headsets, such as smart glasses). Apps can also be executed on other types of computing devices having other form factors, such as laptop computers, desktop computers, and other consumer electronic devices (e.g., smart home appliances, home networking devices, and home automation devices). In some examples, apps may be installed on a computing device prior to a user purchasing the device. In other examples, the user may download and install apps on the computing device after purchasing the device. A native app, as used herein, may refer to an app that is installed and executed on a user device. A web-based app, in turn, may refer to an app that is accessible from a user device via a web browser app.

In some examples, the functionality of an app may be accessed on the computing device on which the app is installed. Additionally, or alternatively, the functionality of an app may be accessed via a remote computing device. In further examples, all of an app's functionality may be included on the computing device on which the app is installed. Such apps may function without communication with other computing devices (e.g., via the Internet). In additional examples, an app installed on a computing device may access information from other remote computing devices during operation. For example, a weather app installed on a computing device may access the latest weather information via the Internet and display the accessed information to the user. In still other examples, an app (e.g., a web-based app) may be partially executed by a user's computing device and partially executed by a remote computing device. For example, a web-based app may be executed, at least in part, by a web server and accessed by a web browser app of a user's computing device. Example web-based apps include web-based email sites, online auction sites, online retail sites, and other websites.

The search system 100 of this disclosure may be implemented as part of a digital distribution platform (e.g., a so-called "app store") configured to distribute native apps to the user device(s) 102. In general, the search system 100 may perform searches for native apps included in (e.g., downloadable from) the system 100 based on user-specified search queries (e.g., text strings) received from the user device(s) 102 and connections (e.g., links to and from other resources) associated with the apps. According to the techniques of this disclosure, the search system 100 may be configured to receive a search query from one of the user device(s) 102 via the network 106. For example, the user device 102 may receive the search query from a user of the device 102 and transmit the query to the search system 100 via the network 106. The search system 100 may be further configured to, upon receiving the search query from the user device 102, perform a search for one or more native apps included in the system 100 based on the query and based on app connection data generated using the analysis system 108. The app connection data may include one or more terms (e.g., alphanumeric strings) associated with one or more resources (e.g., other native apps, app programming interfaces (APIs), app libraries, and/or websites) connected with each of one or more native apps included in the search system 100 by one or more connections. In some examples, the app connection data may further indicate the connections associated with each native app. For example, the analysis system 108 may determine the terms for each native app based on the connections associated with the app (e.g., retrieve the terms from the resources connected with the app by the connections). Based on performing the search, the search system 100 may identify one or more native apps included in the system 100 and generate search results that specify the apps (e.g., that enable a user device 102 to download and install the apps). The search system 100 may also be configured to transmit the search results to the user device 102 via the network 106. The user device 102 may receive the search results from the search system 100 and display the results to the user as one or more user selectable links including image and/or text data. The user may select (e.g., touch, or "click on") any of the user selectable links on the user device 102. In response to the user selecting a particular user selectable link, the user device 102 may download and install (and, e.g., launch) a native app specified by the selected link (e.g., by the associated search result).

In the example of FIG. 1, the search system 100 generates the search results based on the search query, the app connection data, and information included in one or more app records stored in the search data store 112. In this example, each app record may specify a native app. The information included in the app records may include one or more access mechanisms (AMs) that enable the user device(s) 102 to access (e.g., download and install) the native apps specified by the records. For example, each app record may include an ADA (e.g., an alphanumeric string, such as a download link, binary data, or another data structure) that indicates a location where the native app specified by the record may be downloaded. In some examples, the ADA may specify the search system 100 as the location where the native app may be downloaded. In other examples, the ADA may specify another location where the native app may be downloaded (e.g., a website associated with a developer of the app). The search system 100 identifies one or more of the app records based on the search query and app connection data, selects the AMs (e.g., ADAs) from the identified records, and transmits the selected AMs to the user device 102 as the search results. The user device 102 displays the search results to a user of the device 102 as one or more user selectable links that include the AMs. The information included in the app records may also include app attributes (AAs) (e.g., text), such as various features and metadata, and other information (e.g., app names/IDs) associated with the records, which the search system 100 may use to identify the records in the search data store 112 as described above. Example app records are described with reference to FIGS. 4A-4B. The search data store 112, including one or more app records, may include one or more databases, (e.g., inverted) indices, tables, files, or other data structures that may be used to implement the techniques of the present disclosure. In some examples, the search data store 112 may be included in one or more storage devices.

For example, to generate the search results, the search module 110 may identify one or more app records included in the search data store 112 based on the search query and the app connection data. Initially, the search module 110 may analyze the search query. The search module 110 may then identify one or more app records included in the search data store 112 based on the (e.g., analyzed) search query and the app connection data. For example, the search module 110 may identify the app records based on (e.g., text) matches between terms of the search query and terms of information included in the records. In some examples, the search module 110 may further identify the app records based on (e.g., text) matches between terms of the search query and the terms determined for the records, as indicated by the app connection data. The search module 110 may then process (e.g., rank and select a subset of) the identified app records. Specifically, the search module 110 may generate a result score for each identified app record based on how well information included in the record matches the search query. In some examples, the search module 110 may further generate the result score for each identified app record based on how well the terms determined for the record, as indicated by the app connection data, match the search query. The search module 110 may then select one or more of the identified app records that have the highest one or more result scores and transmit indications of (e.g., app names/IDs associated with) the selected records to the result generation module 114.

The result generation module 114 may identify the app records selected by the search module 110 in the search data store 112 using the received indications (e.g., app names/IDs). The result generation module 114 may then select one or more AMs (e.g., ADAs) from the identified app records and transmit the AMs to the user device 102 as search results. In some examples, the result generation module 114 may transmit additional data to the user device 102. For example, as described herein, the search module 110 may generate result scores for the app records from which the AMs are selected (e.g., using various scoring features associated with the search query, the records, and/or the app connection data used to identify and/or rank the records). As such, each AM may be associated with a result score that indicates a rank of the AM relative to the other AMs. In these examples, the result generation module 114 may transmit the result scores associated with the AMs to the user device 102 along with the AMs. In other examples, the result generation module 114 may transmit link data and/or other information associated with the AMs (e.g., with the corresponding app records) to the user device 102.

The search query may include text, numbers, and/or symbols (e.g., punctuation) entered into the user device 102 by the user. For example, the user may have entered the search query into a search field, or "box," of a search app executing on the user device 102. The user may have entered the search query into the search app using a touchscreen keypad, a mechanical keypad, and/or via speech recognition techniques and later caused the app to transmit the query to the search system 100. In some examples, the user may have entered the search query into the search app using various autosuggest (e.g., so-called "autocomplete") techniques. Additionally, or alternatively, the search query may be generated or selected based on an interaction between the user and the user device 102, such as, e.g., in response to the user selecting a link that corresponds to a predefined search query within an app executing on the device 102. In some examples, the search app may be a native app dedicated to search, or a more general app, such as a web browser app. The app connection data, in turn, may include text, numbers, symbols, and/or machine-readable (e.g., binary) data used by the analysis system 108 to represent one or more connections associated with a native app and/or one or more terms associated with one or more resources connected with the app by the connections.

In some examples, the user device 102 may transmit additional data to the search system 100 along with the search query. The search query and the additional data may be referred to herein as a "query wrapper." The additional data may include geo-location data associated with the user device 102, platform data for the device 102 (e.g., a type and/or a version, an operating system (OS), and/or a web browser app associated with the device 102), an identity of the user (e.g., a username), partner specific data, and/or other data (e.g., indications of one or more native apps that are installed on the device 102). The user device 102 may transmit the query wrapper to the search system 100. The search system 100 may receive the query wrapper and use the search query and, e.g., the additional data included in the wrapper, to generate the search results and provide the results to the user device 102.

In other examples, the search system 100 may transmit the search results, including the AMs (e.g., ADAs), to the user device 102 with additional data. For example, the search system 100 may transmit link (e.g., text and/or image) data that the user device 102 may use to generate the user selectable links for the AMs included in the search results. For instance, each user selectable link may include a portion of the link data that the user of the user device 102 may select (e.g., touch, or click on). Each user selectable link may also be associated with one of the AMs included in the search results, such that when the user selects the link, the user device 102 downloads and installs the native app specified by the AM. The link data included in the user selectable link may indicate (e.g., textually and/or graphically) the native app associated with the link. Example user selectable links are illustrated in FIG. 7B.

Figure 2:
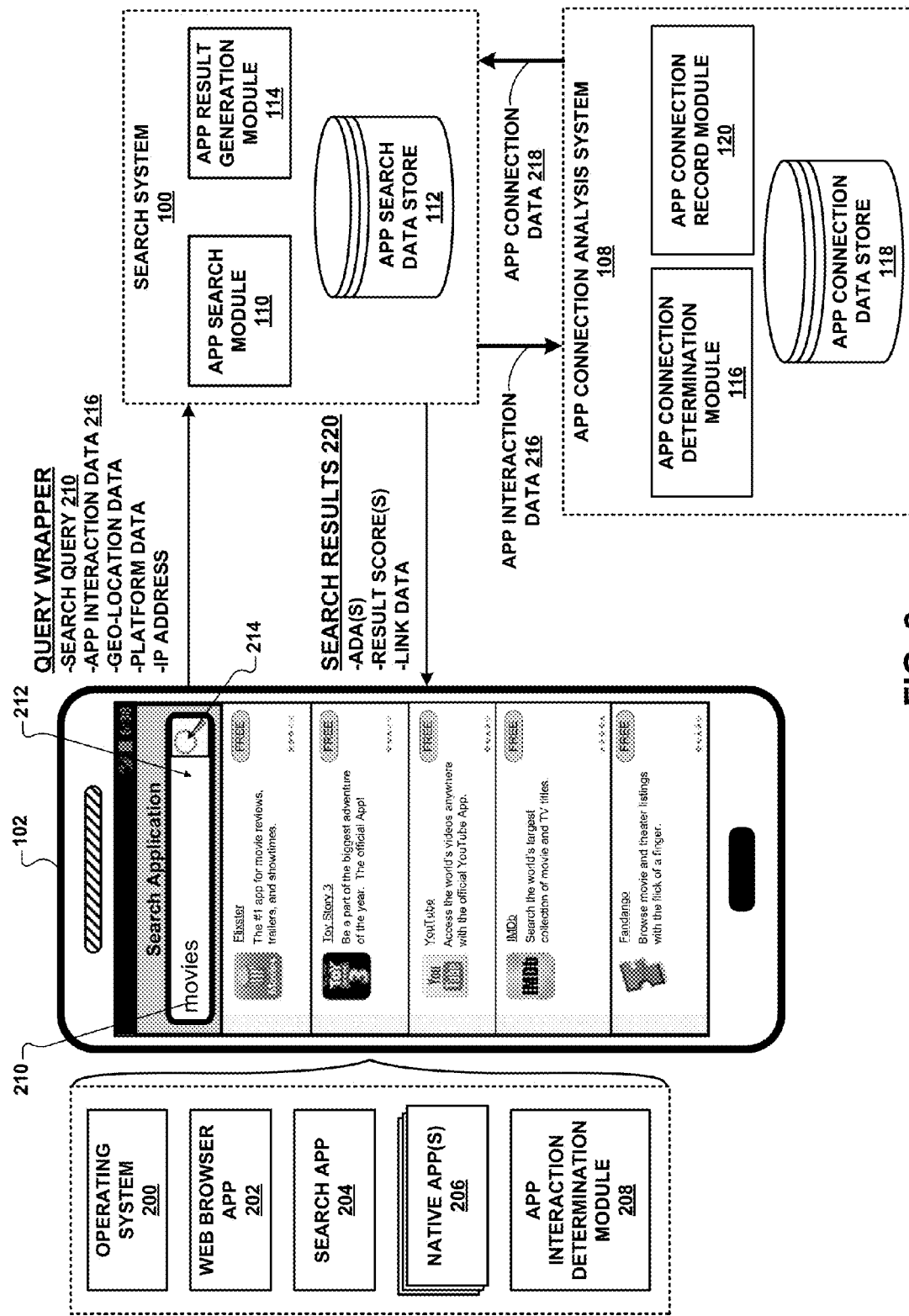
FIG. 2 illustrates an example user device in communication with an example search system and an example app connection analysis system.

The user device(s) 102 may be any computing devices capable of providing search queries and, e.g., app interaction data, to the search system 100 (and, e.g., the analysis system 108) and receiving search results from the system 100. The user device(s) 102 may include any of smartphones, and tablet, laptop, and desktop computing devices. The user device(s) 102 may also include any computing devices having other form factors, e.g., those included in vehicles, gaming devices, televisions, or other appliances (e.g., networked home automation devices and home appliances). The user device(s) 102 may use a variety of different operating systems or platforms (e.g., an OS 200, as shown in FIG. 2). In the event the user device 102 is a mobile device, the device 102 may operate using an OS such as ANDROID® by Google Inc., IOS® by Apple Inc., or WINDOWS PHONE® by Microsoft Corporation. In the event the user device 102 is a laptop or desktop computing device, the device 102 may use an OS such as MICROSOFT WINDOWS® by Microsoft Corporation, MAC OS® by Apple Inc., or LINUX® (LINUX is the registered trademark of Linus Torvalds in the U.S. and other countries). In general, the user device(s) 102 may interact with any of the systems 100, 108 using operating systems other than those described herein, whether presently available or developed in the future.

The user device(s) 102 may communicate with the search system 100 (and, e.g., the analysis system 108) via the network 106. In general, the user device(s) 102 may communicate with any of the systems 100, 108 using any app that can transmit search queries and, e.g., app interaction data, to one or more of the systems 100, 108, and receive search results from the search system 100. In some examples, the user device(s) 102 may include an app that is dedicated to interfacing with one or more of the systems 100, 108, such as an app dedicated to searches (e.g., a search app 204, as also shown in FIG. 2). In other examples, the user device(s) 102 may communicate with any of the systems 100, 108 using a more general app, such as a web browser app (e.g., a web browser app 202, as further shown in FIG. 2). An app included on a user device 102 to communicate with one or more of the systems 100, 108 may display a graphical user interface (GUI) including a search field, or box, into which a user may enter search queries. For example, the user may enter the search queries using a touchscreen, a physical keyboard, a speech-to-text program, or another form of user input available on the user device 102. The app may be configured to transmit the search queries to the search system 100 (e.g., in response to user inputs). In some examples, the app may be further configured to determine (e.g., via an app interaction determination module 208, as shown in FIG. 2) interactions (e.g., data exchanges) between native apps that are installed on the user device 102 (e.g., one or more native apps 206, as also shown in FIG. 2) and other resources. In these examples, the app may be configured to transmit app interaction data indicating the interactions to one or more of the systems 100, 108 (e.g., with the search queries, or separately).

In some examples, the user device 102 may use the same (e.g., dedicated, or more general) app to display the search results received from the search system 100 to the user. For example, the user device 102 may display the search results via the GUI used to receive the search queries from the user and transmit the queries to one or more of the systems 100, 108, as described herein. The GUI may display the search results to the user in a variety of different ways, depending on the information transmitted by the search system 100 to the user device 102 as part of the results. As previously described, the search results may include one or more AMs (e.g., ADAs), along with link data, result scores, and/or other information used to generate user selectable links for the AMs. The GUI may display the search results to the user as a list of the user selectable links, including text and/or images. For instance, the text and/or images may include names of native apps referenced by the AMs, descriptions of the apps, and/or images associated with the apps (e.g., app "icons," or "screenshots"). In additional examples, the GUI may display the search results as the list of the user selectable links arranged under the search field, or box, into which the user has entered a search query. For example, the GUI may arrange the user selectable links by result scores associated with the links, i.e., with the AMs for which the links are generated, or using other logic. In still other examples, the GUI may also group the user selectable links by the associated native app category (e.g., using app category headers). In additional examples, the search system 100 may transmit the search results to the user device 102 via an app programming interface (API). In these examples, the GUI used to display the search results on the user device 102 may be determined (e.g., defined) by a third-party app (e.g., that is associated with the API). For example, the GUI may implement visual (e.g., include text and/or image data), audible (e.g., include a text-to-speech output), and/or any other techniques of presenting the search results to the user on the user device 102.

The data source(s) 104 may be any sources of data that the search system 100 may use to generate and/or update the search data store 112. For example, the search system 100 may use the data source(s) 104 to generate and/or update one or more databases, indices, tables, files, or other data structures (e.g., app records) included in the search data store 112. As an example, the search system 100 may generate new app records and/or update existing app records based on data retrieved from the data source(s) 104. For instance, the search system 100 may include one or more modules (not shown) that generate new app records and/or update existing app records based on the data. In some examples, some or all of the data included in the search data store 112 (e.g., one or more app records) may be manually generated by a human operator.

The data source(s) 104 may include a variety of different data providers. For example, the data source(s) 104 may include data from app developers, such as app developer websites and data feeds provided by app developers. The data source(s) 104 may also include operators of digital distribution platforms configured to distribute apps to user devices. The data source(s) 104 may further include other websites, such as websites that include web logs (i.e., blogs), app reviews, or other data related to apps. Additionally, the data source(s) 104 may include social networking sites, such as "FACEBOOK®" by Facebook Inc. (e.g., Facebook posts) and "TWITTER®" by Twitter Inc. (e.g., text from tweets). The data source(s) 104 may also include other types of data sources, which may have various types of content and update rates. In some examples, the search system 100 may retrieve data from the data source(s) 104, including any type of data related to native apps and/or native app functionality. The search system 100 may then generate one or more app records based on the data and store the records in the search data store 112. In other examples, some or all of the data (e.g., AAs) included in the app records of the search data store 112 may be manually generated by a human operator. Additionally, in some examples, the data included in the app records may be updated over time so that the search system 100 provides up-to-date search results.

FIG. 2 illustrates an example of one of the user device(s) 102 in communication with the search system 100 and analysis system 108. Specifically, FIG. 2 depicts example interactions and data exchanged among the user device 102, search system 100, and analysis system 108. As shown in FIG. 2, the user device 102 may transmit a query wrapper to the search system 100. The query wrapper may include a search query 210, app interaction data 216, geo-location data, platform data, and/or other data (e.g., an IP address) associated with the user, the user device 102, and/or the query 210. For example, the user may have entered the search query 210 into a search field 212 of a GUI of a search app 204 included on the user device 102. The user may have then caused the search app 204 to submit the search query 210 to the search system 100 (i.e., as part of the query wrapper) by selecting a search button 214 of the GUI. In this example, the app interaction data 216 may indicate one or more interactions between one or more native apps 206 included on the user device 102 and one or more other resources. The user device 102 (e.g., the search app 204) may have generated the app interaction data 216 and submitted the data 216 to the search system 100 (e.g., also as part of the query wrapper). For example, the user device 102 may have generated the app interaction data 216 using an app interaction determination module 208 included on the device 102 (e.g., as part of the search app 204). In some examples, the user device 102 may determine the app interaction data 216 prior to, during (e.g., in response to), or after the user enters and/or submits the search query 210.

Upon receiving the query wrapper from the user device 102, the search system 100 may generate one or more search results 220 based on the search query 210 and app connection data 218 generated by the analysis system 108. For example, the analysis system 108 may generate the app connection data 218 based at least in part on the app interaction data 216 received from the user device 102 (e.g., via the search system 100). To generate the search results 220, the search system 100 may identify one or more app records included in the search data store 112 based on the search query 210 and, e.g., the app connection data 218. The search system 100 may further generate results scores for (e.g., rank) the identified app records, e.g., also based on the app connection data 218. The search system 100 may then select one or more of the identified and ranked app records based on the corresponding results scores, select one or more ADAs from the selected records, and transmit the selected ADAs as the search results 220 to the user device 102 (e.g., along with link data, one or more result scores, and/or other information associated with and/or selected from the records).

In the example of FIG. 2, upon receiving the search results 220 from the search system 100, the user device 102 may display the results 220 to the user as one or more user selectable links. For example, the user device 102 may generate the user selectable links such that each link is associated with (e.g., includes) one of the ADAs included in the search results 220. As described herein, each ADA included in the search results 220 may specify a native app (e.g., reference the app and indicate a location where the app may be downloaded). As a result, when the user selects (e.g., touches, or clicks on) each user selectable link, the user device 102 may download and install the native app specified by the ADA included in the link. Upon downloading and installing the native app, the user device 102 may optionally launch the app (e.g., into a default, or main, state of the app). In some examples, the user device 102 may generate the user selectable links using the link data also included in the search results 220. For example, the link data may include any of text (e.g., describing a name of a native app) and image data (e.g., an app icon, or screenshot associated with the app). In this manner, the link data included in (e.g., used to generate) each user selectable link may describe the native app associated with the link (e.g., specified by the ADA included in the link). The user device 102 may further arrange (e.g., order) the user selectable links as part of displaying the links to the user based on the result scores also included in the search results 220. For example, the user device 102 may assign each user selectable link the result score associated with the app record from which the ADA included in the link was selected. The user device 102 may then order the user selectable links based on the corresponding result scores (e.g., display higher-ranking links higher within a list of user selectable links). Example search results 220 displayed to a user of a user device 102 as user selectable links are described with reference to FIGS. 7A-7C.

FIG. 3A illustrates an example of the search system 100. As described herein, the search system 100 generates one or more search results 220 based on a search query 210 received from one of the user device(s) 102, app connection data 218 (e.g., an indication of one or more connections associated with a native app and/or one or more terms determined using the connections) generated by the analysis system 108, and data included in app records of the search data store 112. Specifically, the search module 110 identifies one or more app records included in the search data store 112 based on the search query 210 and, e.g., the app connection data 218. In some examples, the search system 100 further ranks the identified app records, e.g., also based on the app connection data 218. The search module 110 then transmits one or more app names/IDs 222 that identify the identified and, e.g., ranked, app records to the result generation module 114. The result generation module 114 receives the app names/IDs 222 from the search module 110, identifies the app records in the search data store 112 using the names/IDs 222, and selects one or more ADAs from the identified records. The result generation module 114 then transmits the selected ADAs to the user device 102 as the search results 220 (e.g., with link data, result scores, and/or other data associated with the identified app records).

FIG. 3B is a functional block diagram of an example search module 110. FIG. 3B also depicts examples of the search data store 112 and analysis system 108. The search module 110 of FIG. 3B includes a query analysis module 300, a consideration set generation module (hereinafter, "set generation module") 302, and a consideration set processing module (hereinafter, "set processing module") 304. The query analysis module 300 receives a search query 210 from one of the user device(s) 102 (e.g., as part of a query wrapper) and analyzes the query 210 (e.g., performs any of tokenization, filtering, stemming, synonymization, and stop word removal with respect to the query 210). The set generation module 302 identifies one or more app records included in the search data store 112 based on the (e.g., analyzed) search query 210 and, e.g., app connection data 218 received from the analysis system 108. As described herein, the app connection data 218 may indicate connections associated with native apps specified by app records included in the search data store 112 and/or information generated based on the connections (e.g., terms associated with resources connected with the apps by the connections). For example, the set generation module 302 may identify one or more app records included in the search data store 112 based on one or more (e.g., text) matches between one or more terms of the search query 210 and one or more terms of information (e.g., AAs and/or app names/IDs) included in the records. In some examples, the set generation module 302 may further identify at least one of the app records based on one or more (e.g., text) matches between one or more terms of the search query 210 and one or more terms associated with a resource connected with the native app specified by the record by a connection, as indicated by the app connection data 218. The identified app records may be referred to herein as a "consideration set." As a specific example, the set generation module 302 may identify the app records of the consideration set using the search query 210 and, e.g., the app connection data 218, as inputs to Lucene® information retrieval software developed by the Apache Software Foundation.

The set processing module 304 may process (e.g., score and select a subset of) the consideration set. For example, the set processing module 304 may generate a result score for each app record of the consideration set, thereby ranking the records, and select one or more records from the set having the highest one or more result scores. In some examples, the set processing module 304 may generate the result score for at least one of the app records using the app connection data 218 (e.g., one or more terms associated with a resource connected with the native app specified by the record by a connection). The set processing module 304 may then transmit one or more app names/IDs 222 associated with the (e.g., selected) app records of the consideration set to the result generation module 114, as described above.

The information conveyed by the search results 220 may depend on how the set processing module 304 generates the result scores for the app records of the consideration set. For example, for each app record, the corresponding result score may be generated based on various features associated with the record, such as relevance of the native app specified by the record to the search query 210, popularity of the app, and/or other properties of the app, depending on the one or more parameters the set processing module 304 uses to score the app records. The set processing module 304 may generate the result scores for the app records in a variety of different ways. In some examples, the set processing module 304 generates a result score for an app record based on one or more scoring features. The scoring features may be associated with the app record, the search query 210, and/or other data (e.g., app connection data 218). An app record scoring feature (hereinafter, "record scoring feature") may be based on any data associated with an app record. For example, a record scoring feature may be based on any data included in AAs of an app record. An example record scoring feature may be a popularity score (e.g., based on user ratings of a native app) associated with an app record. A query scoring feature may include any data associated with the search query 210. For example, a query scoring feature may include any of a number of words in the search query 210, the popularity of the query 210, and an expected frequency of the words in the query 210. A record-query scoring feature may include any data generated based on information associated with both an app record and a search query 210 that resulted in identification of the record by the set generation module 302. For example, a record-query scoring feature may include any parameters that indicate how well terms of a search query 210 match terms of AAs (and/or an app name/ID) of an app record identified using the query 210. In some examples, as described herein, the set processing module 304 may generate a result score for an app record based on the app connection data 218. In these examples, an "app connection" scoring feature may include any data associated with the app connection data 218 (e.g., an indication of one or more connections associated with a native app and/or one or more terms associated with one or more resources connected with the app by the connections). For example, an app connection scoring feature may include any parameters that indicate how well terms of a search query 210 match terms (indicated by the app connection data 218) determined for an app record identified using the query 210. In a specific example, the set processing module 304 may generate a result score for an app record based on one or more (e.g., text) matches between one or more terms of the search query 210 and one or more terms associated with a resource connected with a native app specified by the record by a connection, as indicated by the app connection data 218. In general, the set processing module 302 may generate a result score for an app record using any of the record, query, record-query, app connection scoring features, and/or any additional scoring features not explicitly listed.

In some examples, to generate the result scores for the app records of the consideration set, the set processing module 304 may include one or more machine-learned models (e.g., a supervised learning model, for example, including regression) configured to receive one or more of the record, query, record-query, and app connection scoring features described herein. For example, the set processing module 304 may pair the search query 210 with each app record and calculate a vector of features for each (query, record) pair. The vector of features may include one or more record, query, record-query, and app connection scoring features. The set processing module 304 may then input the vector of features into a machine-learned relevance (MLR) model to calculate a result score for the app record (e.g., simultaneously based on the features). In some examples, the MLR model may include a set of (e.g., gradient-boosted) decision trees. In other examples, the MLR model may be trained by a simple form of logistic regression. In still other examples, the machine-learned task described herein can be framed as a semi-supervised learning task, where a minority of training data is labeled with human-curated result scores and the rest of the data is used without such labels.

As described herein, the result scores associated with the app records (e.g., the ADAs included therein) may be used in various different ways. In some examples, the result scores may be used to rank (e.g., order) the ADAs in a list. In these examples, a higher result score may indicate that the corresponding ADA (e.g., native app) is more relevant to the user than an ADA having a smaller result score. In examples where the search results 220 are displayed as a list of user selectable links on the user device 102, the links including ADAs associated with larger result scores may be listed closer to the top of the list (e.g., near the top of the screen). In these examples, links including ADAs having lower result scores may be located farther down the list (e.g., off screen) and may be accessed by scrolling down the screen of the user device 102.

Figure 4B:
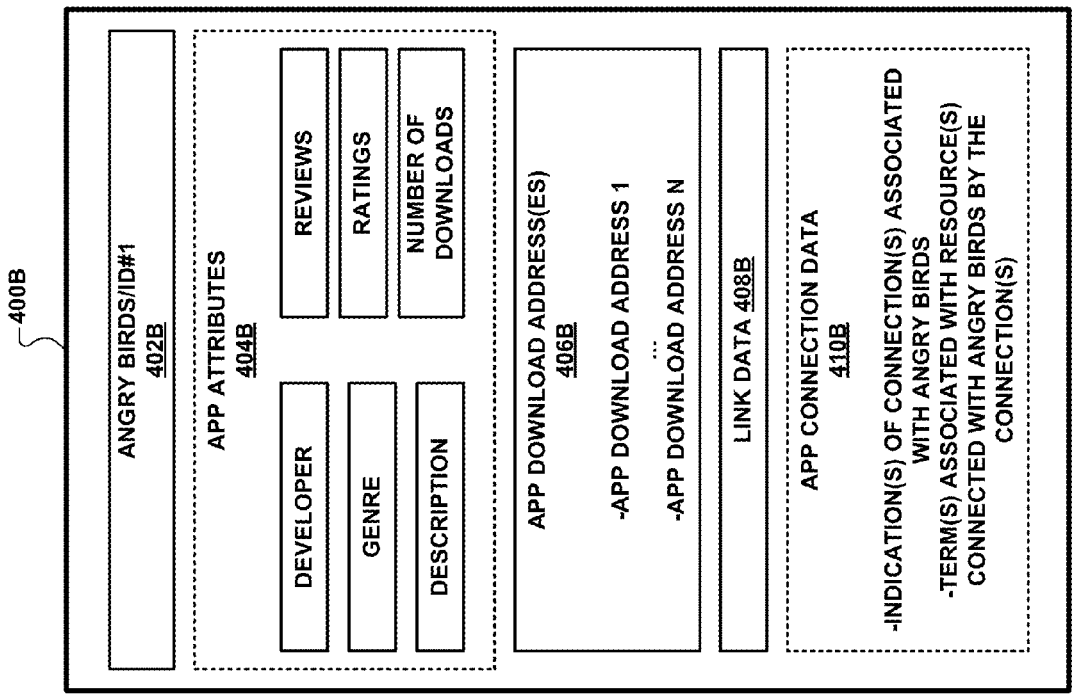
FIGS. 4A-4B illustrate example app records.
Figure 4A:
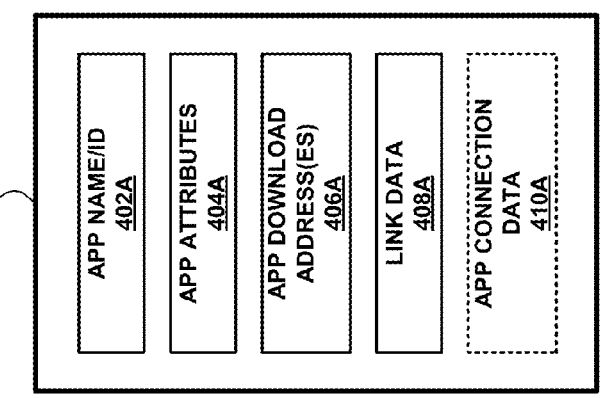

FIGS. 4A-4B illustrate example app records 400A, 400B that may be included in the search data store 112. FIG. 4A illustrates a general example of an app record 400A. The app record 400A of FIG. 4A includes information related to (e.g., specifying) a native app (e.g., any native app included in a digital distribution platform). The app record 400A may generally represent data stored in the search data store 112 that is related to a native app. The search data store 112 may include one or more app records each having a similar structure as that of the app record 400A. In other words, the search data store 112 may include one or more app records each having an app name/ID, one or more AAs, one or more ADAs, and, e.g., link and/or app connection data associated with the record, which are described in greater detail herein.

As shown in FIG. 4A, the app record 400A includes an app name/ID 402A that uniquely identifies the record 400A among other app records included in the search data store 112. In some examples, the app name/ID 402A may correspond to a name of the native app specified by the data included in the app record 400A. For example, the app name/ID 402A may include any of "Google Maps," "Facebook," "Twitter," "Microsoft Word," and "Angry Birds." Additionally, or alternatively, the app name/ID 402A may include an alphanumeric ID (e.g., an index) associated with the native app specified by the app record 400A (e.g., assigned to the app by the search system 100). In general, the app name/ID 402A may be a string of alphabetic, numeric, and/or symbolic characters (e.g., punctuation marks) that uniquely identify the app record 400A among other app records included in the search data store 112.

As further shown, the app record 400A includes AAs 404A (e.g., text) that describe the native app specified by the record 400A, and which may be used to identify the record 400A in the search data store 112. The AAs 404A may include data fields for any of a name of a developer (e.g., a publisher) of the native app, a genre (e.g., a category) of the app, a description of the app, user reviews for the app, user ratings for the app, and a number of downloads associated with the app. For example, the name of the developer of the native app may be "Rovio Entertainment Limited." The genre of the native app may be "games." In some examples, the developer of the native app may provide the description and/or the genre associated with the app. In other examples, the search system 100 may provide any of the description and genre of the native app. The data field associated with the user reviews may include text from reviews of the native app by users. The data field associated with the user ratings may indicate ratings (e.g., a number of stars, such as 0-5 stars) given to the native app by users. The data field associated with the number of downloads may indicate a total number of times users have downloaded the native app to a user device 102. In some examples, the AAs 404A may also describe one or more functions provided by the native app, such as, e.g., "search for travel destinations," "make restaurant reservations," and "buy movie tickets."

In additional examples, the AAs 404A may include other information relating to the native app specified by the app record 400A, such as any of a version of the app, an OS associated with the app, a price of the app, security and/or privacy data regarding the app, and battery and/or bandwidth usage of the app. The AAs 404A may also include various numeric data (e.g., statistics) associated with the native app, such as any of a download rate (e.g., a number of downloads per month) and a number of user ratings and/or user reviews associated with the app. The AAs 404A may also include information retrieved from websites, such as user reviews associated with the native app, articles associated with the app (e.g., wiki articles), and/or other information. In some examples, the AAs 404A may further include digital media related to the native app, such as images (e.g., icons and/or screenshots) associated with the app.

In general, the AAs 404A may include any type of data associated with the native app specified by the app record 400A, including various different types of data, such as structured, semi-structured, and/or unstructured data. For example, the AAs 404A may include information extracted or inferred from documents retrieved from the data source(s) 104. Additionally, or alternatively, the AAs 404A may include data generated manually by a human operator. In some examples, the AAs 404A may be updated so that the search system 100 may provide up-to-date search results 220 in response to receiving a search query 210 from one of the user device(s) 102.

As also shown, the app record 400A includes one or more ADAs 406A that enable a user device 102 to access (e.g., download and install) the native app specified by the record 400A. In some examples, the app record 404A may include multiple ADAs 406A that are each configured to enable a user device 102 to access the native app on a different OS or platform. In these examples, to generate search results 220 based on a search query 210 received from one of the user device(s) 102, the search system 100 (e.g., the result generation module 114) may select one of the multiple ADAs 406A that corresponds to the OS or platform associated with the device 102. As further shown in FIG. 4A, the app record 400A may also include link data 408A, which may include text indicating a name of the native app specified by the record 400A and/or image data (e.g., one or more app icons, or screenshots) associated with the app.

As shown in FIG. 4A, the app record 400A may optionally include app connection data 410A. The app connection data 410A may indicate one or more connections associated with the native app specified by the record 400A. Additionally, or alternatively, the app connection data 410A may indicate one or more terms associated with one or more (e.g., native app and/or non-app) resources connected with the app by the connections. As described herein, the analysis system 108 may initially generate app connection data 218 indicating the connections and/or the terms. The search system 100 may then store the app connection data 218 in the app record 400A as the app connection data 410A and later use the data 410A to identify and/or rank the record 400A in response to receiving a search query 210 from one of the user device(s) 102. In some examples, the search system 100 may store the app connection data 218 in the app record 400A as part of the AAs 404A (e.g., by augmenting the AAs 404A to include the indication of the connections and/or the terms).

In additional examples (not shown), the app record 400A may also include information that describes values of one or more metrics associated with the native app specified by the record 400A. Example metrics include popularity of (e.g., a number of downloads associated with) the native app and/or user ratings associated with the app. The information included in the app record 400A may also be based on measurements associated with the record 400A, such as how often the record 400A is retrieved during a search and how often user selectable links generated for any of the ADA(s) 406A of the record 400A are selected by a user.

FIG. 4B illustrates a specific example of an app record 400B that specifies the native application "ANGRY BIRDS®" by Rovio Entertainment Limited, (hereinafter, "Angry Birds"). As shown in FIG. 4B, the app record 400B includes an app name/ID "Angry Birds/ID#1" 402B that uniquely identifies the record 400B among other app records included in the search data store 112. In other examples, the app name/ID 402B may be a numeric value, or have another (e.g., machine-readable) representation. As further shown, the app record 400B includes AAs 404B that describe the native app specified by the record 400B (i.e., Angry Birds), and which (e.g., along with the app name/ID 402B) the search system 100 (e.g., the set generation module 302) may use to identify the record 400B in the search data store 112. For example, as described herein, the search system 100 may identify the app record 400B in the search data store 112 based on (e.g., text) matches between terms of a search query 210 received from one of the user device(s) 102 and terms of the AAs 404B. The AAs 404B of FIG. 4B describe a developer, a genre, a description, user reviews, user ratings, and a number of downloads associated with Angry Birds, in a similar manner as described with reference to the app record 400A.

As also shown, the app record 400B further includes one or more ADAs 406B that enable a user device 102 to access Angry Birds. Specifically, the ADA(s) 406B each indicate a location where the user device 102 may download Angry Birds. As explained herein, each of the ADA(s) 406A may specify a location where the user device 102 may download a particular version of Angry Birds corresponding to the specific OS or platform associated with the device 102. As further shown, the app record 400B also includes link data 408B, which may include a text string "Angry Birds" and an app icon, or a screenshot, associated with Angry Birds.

The app record 400B also optionally includes app connection data 410B indicating one or more connections associated with Angry Birds and/or one or more terms associated with one or more resources connected with Angry Birds by the connections. As described herein, the analysis system 108 may initially generate app connection data 218 indicating the connections and/or terms. The search system 100 may then store the app connection data 218 in the app record 400B as the app connection data 410B and later use the data 410B to identify and/or rank the record 400B in the manner described herein.

FIG. 5A illustrates example interactions and data exchanged among one of the user device(s) 102, the search system 100, the analysis system 108, and one or more APIs (e.g., servers and data stores) 500-1 . . . 500-N associated with native apps specified by app records included in the search data store 112. As described herein, the analysis system 108 generates app connection data 218 for each of one or more native apps specified by app records included in the search data store 112. In other words, the analysis system 108 generates the app connection data 218 for each of one or more of the app records. As further described herein, app connection data 218 associated with a particular native app (e.g., with a corresponding app record included in the search data store 112) may indicate one or more connections associated with the app and/or information (e.g., one or more terms) generated for the app (e.g., for the app record) based on the connections. In some examples, the analysis system 108 may generate app connection data 218 for a subset of the native apps specified by the app records included in the search data store 112 (e.g., some native apps may not be associated with connections). In other examples, for a particular native app specified by an app record included in the search data store 112, the analysis system 108 may generate app connection data 218 that indicates a subset of the connections associated with the app (e.g., the system 108 may be unable to identify all connections associated with the app).

In this disclosure, a connection associated with a native app may include any of a variety of connection types. In some examples, the connection may refer to a so-called "outbound" link included in the native app that is used by the app to retrieve data from another resource (e.g., a "deep link," or a passed intent to an activity that is not part of the app, as in the case of ANDROID® by Google). In other examples, the connection may refer to a so-called "inbound" link included in another resource that is used by the resource to retrieve data from the native app. In further examples, the connection (e.g., the outbound or inbound link) may be between the native app and another, different native app. In other words, the connection may facilitate the exchange of data between two native apps. In other examples, the connection may be between the native app and a resource associated with a native app, such as an API associated with a native app, or a "native API" (e.g., one or more servers and data stores used by a native app), a native app library (e.g., portions of code associated with a native app), or another resource, such as a website associated with a native app (e.g., a web-equivalent of a native app). For example, the connection may be between the native app and an API, an app library, and/or a website associated with another native app. In some examples, the native app may include the native app library (e.g., instructions) associated with the other native app. In these examples, the native app library being included in the native app may constitute a connection between the app and the other native app. In still other examples, the connection may be between the native app and a non-app resource, such as a website (e.g., a web-based app not associated with a native app), an advertisement (ad) network, or another web resource (e.g., a multiplayer game server). As such, the connection may be directional and have an associated type. In this manner, a connection associated with a native app, as described herein, may be a connection between the app and various different resources.

Figure 6D:
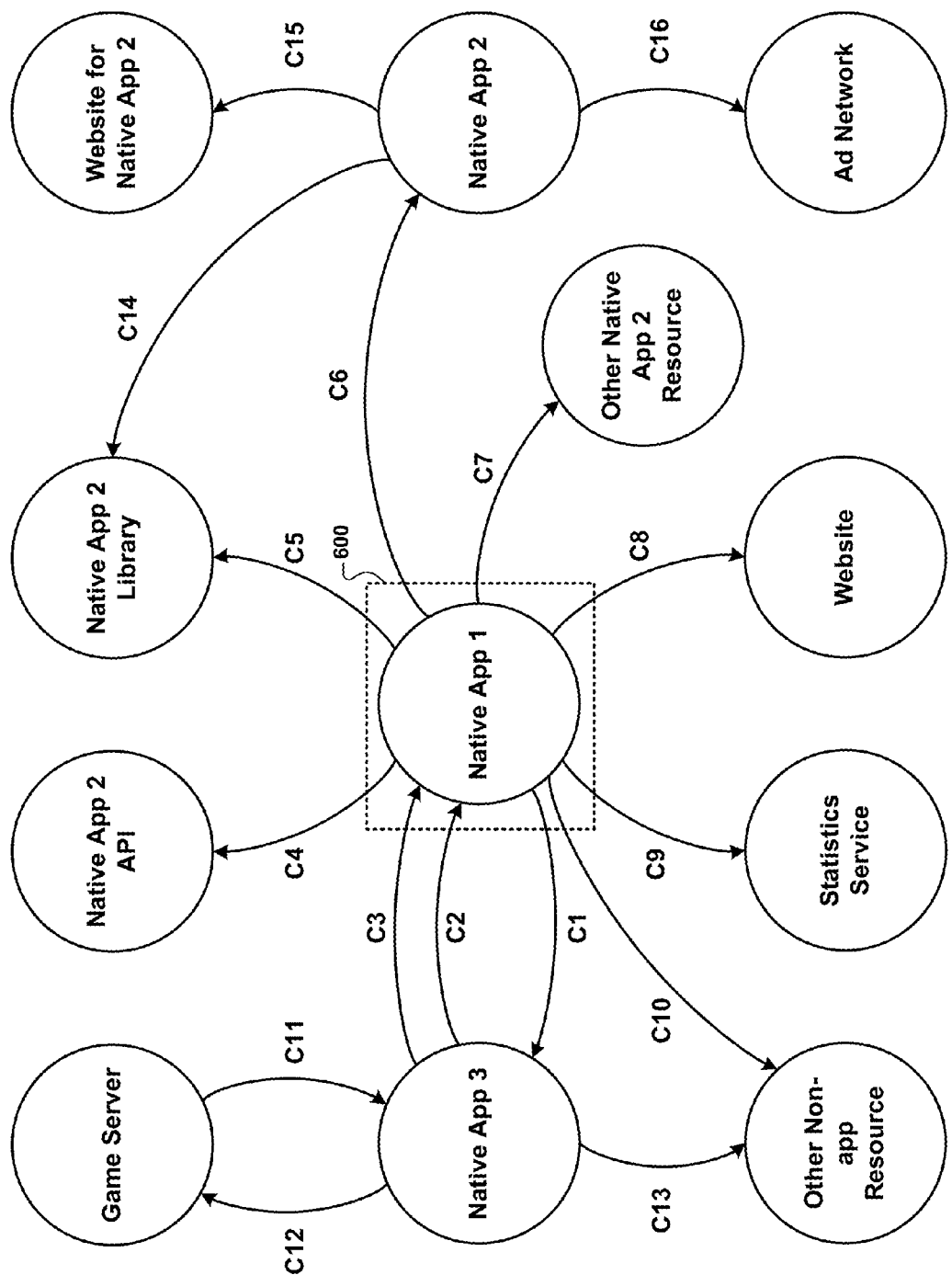

As shown in FIG. 5A, the analysis system 108 includes the connection determination module 116, connection data store 118, and connection record module 120. The connection determination module 116 may generate the app connection data 218 for each of the one or more native apps specified by the app records included in the search data store 112. The connection record module 120 may generate one or more connection records used to store the app connection data 218 generated by the connection determination module 116 and store the records, including the data 218, in the connection data store 118. In some examples, upon the connection determination module 116 generating the app connection data 218, the module 116 may further generate a so-called "app connection graph" (e.g., as shown in FIG. 6D) representing the data 218, namely, one or more connections associated with each native app. In these examples, the connection record module 120 may generate a connection record used to store the app connection graph and store the record, including the graph, in the connection data store 118.

In this example, to generate app connection data 218 for a native app specified by a particular app record included in the search data store 112, the connection determination module 116 may be configured to perform any of the following actions. Initially, the connection determination module 116 may determine (e.g., identify) one or more connections associated with the native app. For example, to determine the connections, the connection determination module 116 may perform any combination of static and dynamic connection analyses with respect to the native app. As one example, to perform the static connection analysis, the connection determination module 116 may analyze one or more commands (e.g., human-readable programming language instructions, or machine-readable instructions specifying operations to be performed by a processing unit) associated with the native app (e.g., with an executable binary object associated with the app). In some examples, the commands may be a part of various code components of the native app having various levels of abstraction, and which may interoperate via messages, events, and/or so-called "intents." For example, the connection determination module 116 may analyze the commands associated with the native app by accessing an API (e.g., an API data store) associated with the app, or another resource that stores the commands and where the commands are not being executed by a processing unit (e.g., in an "off-line" manner). For instance, as shown in FIG. 5A, the connection determination module 116 may access one of the API(s) 500-1 . . . 500-N (e.g., one of API data store(s) 502-1 . . . 502-N included therein) associated with the native app. In this example, the API(s) 500-1 . . . 500-N may be associated with one or more native apps 504-1 . . . 504-N specified by one or more app records 400A-1 . . . 400A-N included in the search data store 112, as indicated by dashed line 506. As a result of performing the analysis, the connection determination module 116 may identify one or more commands configured to invoke communication (e.g., data exchange) between the native app and one or more other resources. For example, as shown in FIG. 5D, the connection determination module 116 may include a static analysis module 516 that, in turn, includes a command analysis module 518 configured to analyze commands associated with native apps without fully executing the apps and determine connections for each app based on the commands. In this manner, the connection determination module 116 may determine one or more connections corresponding to one or more outbound links associated with the native app. To determine connections corresponding to inbound links associated with the native app, the connection determination module 116 may perform static connection analysis with respect to another native app that retrieves data from the app, in a similar manner as described above.

As another example, to perform the dynamic connection analysis, the connection determination module 116 may monitor one or more live interactions (e.g., data exchanges) between the native app and one or more other resources. For example, the connection determination module 116 may detect the interactions between the native app (e.g., in response to a user input) and resources while the app executes on a computing device, such as a user device 102, or an API associated with the app (e.g., in a "real-time" manner). Alternatively, the connection determination module 116 may receive an indication of the interactions from a computing device that executes the native app. For example, as shown in FIG. 5A, the connection determination module 116 may receive app interaction data 216 indicating the interactions from the user device 102 (e.g., assuming the native app is included on the device 102). In other examples, the connection determination module 116 may receive the app interaction data 216 from another location (e.g., from one of the API(s) 500-1 . . . 500-N associated with the native app). By monitoring the interactions, the connection determination module 116 may identify one or more resources with which the native app is configured to communicate (e.g., exchange data). For example, as also shown in FIG. 5D, the connection determination module 116 may include a dynamic analysis module 520 that, in turn, includes a data exchange detection module 522 configured to monitor interactions (e.g., data exchanges) between executing native apps and other resources and determine connections for each app based on the interactions. Additionally, or alternatively, as also shown, the data exchange detection module 522 may be configured to receive an indication of the interactions (e.g., as app interaction data 216) and determine the connections for each native app based on the data 216. In this manner, the connection determination module 116 may determine one or more connections corresponding to one or more outbound and/or inbound links associated with the native app. In general, the connection determination module 116 may determine one or more connections associated with the native app by performing any combination of the static and dynamic connection analyses, or by receiving equivalent or analogous inputs from a parallel system (or a set of multiple systems) tasked with performing the static and/or dynamic connection analysis.

In some examples, another system or device, rather than the connection determination module 116, may perform any of the static and dynamic connection analyses described above. In these examples, the connection determination module 116 may receive an output of this system or device and determine the one or more connections associated with the native app based on the output. In some examples, the connection determination module 116 may determine the connections based on known markers included in the output. In other examples, the connection determination module 116 may determine the connections based on outputs corresponding to static and/or dynamic connection analyses performed for other native apps.

In some examples, to generate the app connection data 218 for the native app, the connection determination module 116 may be configured to identify any combination of one or more so-called "explicit" and "inferred" connections associated with the app. As one example, to identify an explicit connection associated with the native app, the connection determination module 116 may identify a connection between the app and another resource (e.g., another native app, or a non-app resource). For instance, the connection determination module 116 may identify a user selectable link included in the native app that links to (e.g., opens a state of) another native app, or a website that does not correspond to a native app. As another example, to identify an inferred connection associated with the native app, the connection determination module 116 may identify a connection between the app and a website (e.g., a user selectable link included in the app that links to the website). In this example, the website may correspond to another native app (e.g., the website may be a web-based app that is a web-equivalent of the other app). Upon identifying the connection between the native app and the website, the connection determination module 116 may infer the connection between the app and the other native app. In other examples, the connection determination module 116 may similarly infer the connection between the native app and the other native app based on a connection between the app and any of an API, an app library, and another resource associated with the other app.

In a specific example, the connection determination module 116 may initially analyze each of one or more native apps, e.g., each represented by a native app binary, and generate app connection data 218 that indicates (e.g., using one or more alphanumeric strings) one or more connections associated with each app. For example, an input to the connection determination module 116 may be the string "YouTube_1_Android_OS2.3, YouTube_2_Android_OS5.2, Facebook . . . " indicating the native apps. In this example, the app connection data 218 may indicate various relationships between each native app and one or more associated connections as follows: "App 1: -->URL2, App1 includes Library 3, App2: --> URL4 . . . " The connection determination module 116 may then assign indicators (e.g., IDs) to the determined connections, e.g., as follows: "URL2===APP_id='YouTube 1232323,' Library 3===Unknown, URL4===Unknown, Library 5===App_id='YouTube_1232323' . . . " The connection determination module 116 may optionally normalize the data described above. The connection determination module 116, or a component of the search system 100 (e.g., a record generation/update module) may then augment the corresponding app records included in the search data store 112 to include the (e.g., normalized) data. For example, the app records may be augmented to include various features derived from the determined connections, such as "a number of inbound links," "a number of outbound links," "link quality" (e.g., as determined using one or more algorithms), and a list of other app records (e.g., app IDs included therein) that specify other native apps connected with the native apps specified by the records. As a specific example, an app record (e.g., "App_record_1") specifying the native app YouTube (e.g., corresponding to the canonical app YouTube) may be augmented to include the following data: "App_record_1 (All YouTube): num_in_links=1, num out links=12, connected-app_record_ids: [facebook, netflix, IMDB]."

In the example of FIG. 5A, upon determining the one or more connections associated with the native app, the connection determination module 116 may be further configured to determine one or more terms (e.g., alphanumeric strings) associated with one or more resources connected with the app by the connections. For example, the connection determination module 116 may determine the terms based on the connections using an app term determination module 508, as shown in FIG. 5B. The app term determination module 508 receives the app connection data 218, including an indication of the connections, as an input, and generates one or more terms 510 as an output. For example, the app term determination module 508 may be a part of the connection determination module 116, another module included in the analysis system 108, or within another stand-alone system or device. In some examples, upon identifying a particular connection associated with the native app that connects the app with another native app, an API associated with the other app, or an app library associated with the other app, the connection determination module 116 may select from the corresponding resource one or more terms describing a name of the other app, a function performed by the other app, a category associated with the other app, and/or a description (e.g., a set of descriptive terms) of the other app as the terms determined for the app. In other examples, upon identifying a connection associated with the native app that connects the app with another native app specified by another app record included in the search data store 112, the connection determination module 116 may select one or more terms of the AAs included in the other app record as the one or more terms determined for the app. In still other examples, upon identifying a connection associated with the native app that connects the app with a website, the connection determination module 116 may select one or more terms displayed on the website as the terms determined for the app. As a specific example, the connection determination module 116 may select one or more terms included in a document object model associated with the website. In this manner, one or more properties (e.g., as described by one or more terms) associated with a particular resource connected with the native app by a connection associated with the app may be attributed to the app by virtue of selecting the terms for (e.g., associating the terms with) the app. In some examples, to select one or more terms from a resource connected with the native app by a connection, the connection determination module 116 may use a set of one or more rules that define where in the resource, how many, and/or which terms are to be selected from the resource. In other examples, the connection determination module 116 may select one or more terms from documentation or other material describing a resource, rather than from the resource itself. In these examples, the documentation or other material may be generated automatically and/or by a human operator.

Upon the connection determination module 116 generating the app connection data 218 for the native app, including the terms determined for the app and/or an indication of the connections associated with the app, the analysis system 108 transmits the data 218 to the search system 100, which may use the data 218 as described herein. In some examples, search system 100 may store some or all of the app connection data 218 (e.g., the terms and/or the indication of the connections) in the corresponding app record included in the search data store 112. As described with reference to FIG. 4A, the search system 100 may store the app connection data 218 in a designated field of the app record, or within one or more AAs included in the record. For example, the search system 100 may augment the AAs to include the app connection data 218 using an AAs augmentation module 512, as shown in FIG. 5C. The AAs augmentation module 512 receives one or more AAs 404A included in an app record 400A and one or more terms 510 determined for the record 400A by the connection determination module 116 as inputs and generates one or more augmented AAs 514 for the record 400A as an output. For example, the AAs augmentation module 512 may be a part of the search module 110, another module included in the search system 100, or in another stand-alone system or device.

FIGS. 6A-6C illustrate various types of connections that may be associated with a native app. FIG. 6A depicts a native app ("Native App 1") that is connected with any combination of 1) another native app (e.g., "Native App 2"), 2) an API associated with the other app (e.g., "Native App 2 API"), 3) an app library associated with the other app (e.g., "Native App 2 Library"), 4) a website associated with the other app (e.g., a web equivalent of the other app), and 5) another resource associated with the other app that is not explicitly listed. In the example of FIG. 6A, Native App 1 is connected with one or more resources each of which is either a native app, or is associated with a native app. FIG. 6B depicts an example in which a connection between a native app ("Native App 1") and another native app ("Native App 2") is inferred based on a connection between the app and any of 1) an API associated with the other app, 2) an app library associated with the other app, 3) a website associated with the other app, and 4) another resource associated with the other app that is not explicitly listed. FIG. 6C depicts a native app ("Native App 1") that is connected with any combination of 1) a website not associated with another native app, 2) an ad network, 3) a game server, 4) a statistics service (e.g., Google Analytics® by Google Inc.) and 5) another non-app resource not explicitly listed. In the example of FIG. 6C, Native App 1 is connected with one or more non-app resources.

FIG. 6D illustrates an example representation of connections associated with native apps. The representation shown in FIG. 6D may be referred to herein as an "app connection graph" and may be included as part of app connection data 218 generated by the analysis system 108. The app connection graph of FIG. 6D indicates one or more connections ("C1" ... "C16") associated with each of one or more native apps ("Native App 1" ... "Native App 3") specified by one or more app records included in the search data store 112. As shown in FIG. 6D, the connections are configured to link (e.g., facilitate data exchange between) each of the native apps and one or more other resources, such as another native app (e.g., another one of the apps), an API, an app library, and/or a non-app resource (e.g., a website, an ad network, or another resource). The analysis system 108 may generate the app connection graph of FIG. 6D by identifying the connections associated with the native apps using any of the static and dynamic connection analysis techniques described herein. In some examples (not shown), the analysis system 108 may further include indications of (e.g., app names/IDs included in app records specifying) the native apps within the app connection graph. Upon generating the app connection graph, the analysis system 108 may store the graph in a connection record included in the connection data store 118 for later retrieval. At a later point in time (e.g., in response to the search system 100 receiving a search query 210), the analysis system 108 may retrieve and traverse the app connection graph to determine the one or more connections associated with a particular one of the native apps 600. Traversing the app connection graph may enable the analysis system 108 to determine the connections associated with the native app 600 relatively quicker than by performing the static and/or dynamic connection analysis for the app 600.

FIGS. 7A-7C depict example GUIs that may be generated on one of the user device(s) 102 according to this disclosure. In particular, the examples of FIGS. 7A-7C depict the user device 102 performing a search for native apps using a search query 210 specified by a user of the device 102 and app connection data 218 associated with the apps. As shown in FIG. 7A, the user initially enters a search query "movies" 210 into a search field 212 of a GUI of a search app 204 executing on the user device 102. As also shown, the user then interacts with a search button 214 of the GUI to cause the search app 204 to transmit the search query 210 to the search system 100. As described herein, in some examples, the user device 102 (e.g., the search app 204) may also transmit app interaction data 216 to the search system 100 (e.g., with the search query 210, or separately). As also described herein, the user device 102 (e.g., the app interaction determination module 208) may generate the app interaction data 216 by monitoring interactions (e.g., data exchanges) between the native app(s) 206 included on the device 102 and other (e.g., native app and/or non-app) resources. In these examples, the app interaction data 216 may indicate the interactions between the native app(s) 206 and the other resources.

The search system 100 may receive the search query 210 and, e.g., the app interaction data 216, from the user device 102. The search system 100 may then generate search results 220 that each specify a native app based on the search query 210 and app connection data 218 generated by the analysis system 108, as described herein. In some examples, the analysis system 108 may generate the app connection data 218 using the app interaction data 216 received from the user device 102, as also described herein. In the example of FIGS. 7A-7C, the search results 220 specify the native apps Flixster, Toy Story 3, YouTube, IMDb, and Fandango. In this example, the app connection data 218 used by the search system 100 to generate the search results 220 may indicate one or more terms associated with each of these native apps and determined based on one or more connections associated with the corresponding app. In some examples, the app connection data 218 may also indicate the connections associated with each of the native apps. To generate the search results 220, the search system 100 may identify app records included in the search data store 112 that specify Flixster, Toy Story 3, YouTube, IMDb, and Fandango. As described herein, the search system 100 may identify the app records based on the search query 210. In some examples, the search system 100 may further identify the app records based on the app connection data 218 (e.g., the terms), as also described herein. Additionally, or alternatively, the search system 100 may rank the identified app records, e.g., based on the app connection data 218 (e.g., the terms), as further described herein. The search system 100 may select one or more ADAs from the identified and, e.g., ranked, app records and transmit the search results 220, including the ADAs, to the user device 102.

As shown in FIG. 7B, the user device 102 receives the search results 220 from the search system 100 in response to transmitting the search query 210 and, e.g., the app interaction data 216, to the system 100. As also shown, the user device 102 displays the search results 220 to the user as user selectable links 226-1 . . . 226-5 (collectively, the "links 226"). For example, the user device 102 may generate each of the links 226 using link (e.g., text and/or image) data also received from the search system 100 as part of the search results 220. In this example, the search results 220 are responsive to the search query 210 (i.e., the text string "movies"). In particular, the search results 220 specify the native apps Flixster, Toy Story 3, YouTube, IMDb, and Fandango, which are each associated with movies and related services. As further shown, the user device 102 may order the links 226 within a list. For example, the user device 102 may order each link 226 based on the result score associated (e.g., received) with the corresponding one of the search results 220. As also shown, the user device 102 may display the links 226 such that one or more of the links 226 each indicate to the user (e.g., via any of GUI elements 224A . . . 224E) that the corresponding native app is accessible on the device 102 free of charge.

As also shown in FIG. 7B, the user may select (e.g., touch, or click on) one of the links 226 on the user device 102, namely the user selectable link 226-4 referencing IMDb. As shown in FIG. 7C, upon the user selecting the user selectable link 226-4, the user device 102 may download (e.g., from a digital distribution platform using an ADA included in the link 226-4) and install IMDb. As also shown, upon downloading and installing IMDb, the user device 102 may further launch IMDb. Specifically, as depicted in FIG. 7C, the user device 102 may configure IMDb to display a GUI 700 corresponding to the main, or default screen of IMDb. Upon the user device 102 downloading, installing, and launching IMDb in the manner described herein, the user may interact with IMDb (e.g., search for movie entries within IMDb).

Figure 8:
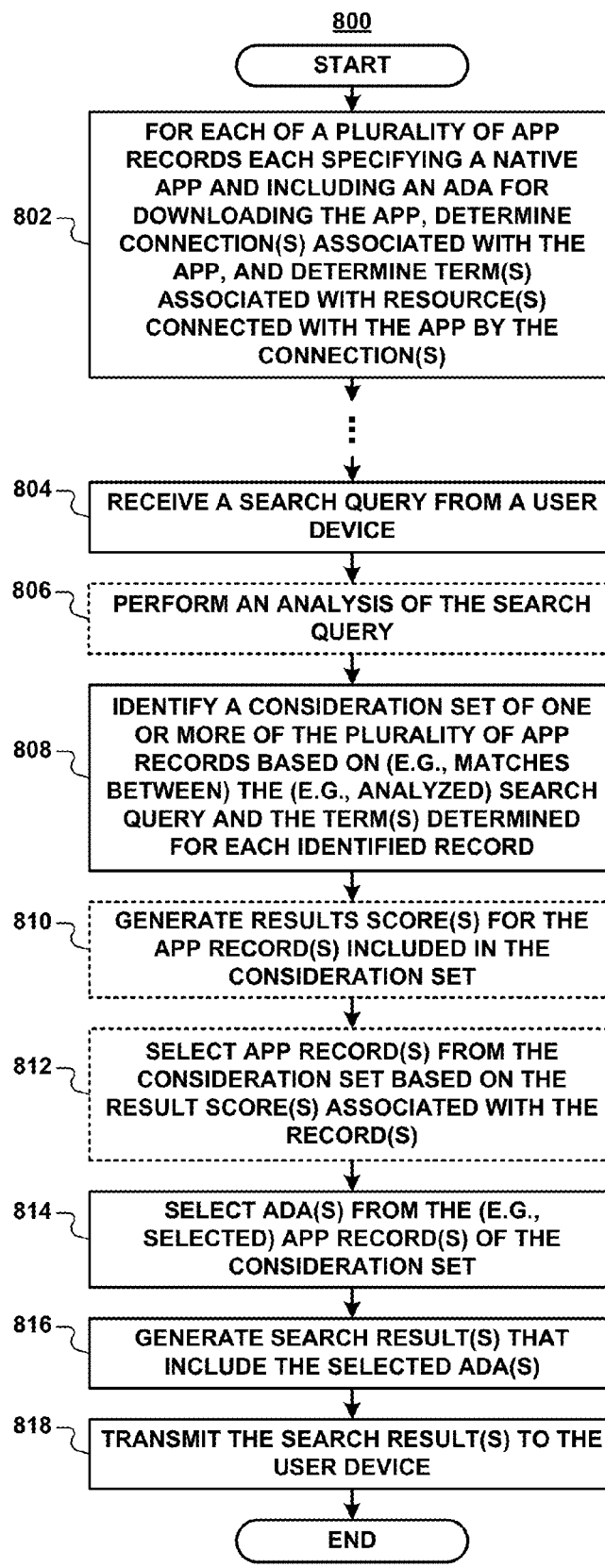
FIGS. 8-11 are flow diagrams that illustrate example methods for generating search results based on a search query and app connection data using a search system.

FIG. 8 is a flow diagram that illustrates an example method 800 for generating search results 220 based on a search query 210 and app connection data 218 using the search system 100. As shown in FIG. 8, in block 802, the analysis system 108 may initially, for each of a plurality of app records included in the search data store 112 each specifying a native app and including an ADA for downloading the app, determine one or more connections associated with the app and determine one or more terms associated with one or more resources connected with the app by the connections. As described herein, to determine the connections associated with the native app, the analysis system 108 may perform any of static connection analysis (e.g., analyze software instructions associated with the app) and dynamic connection analysis (e.g., detect interactions between the app and other resources). As further described herein, to determine the terms associated with the resources connected with the native app by the connections, the analysis system 108 may retrieve the terms from an app record, an API, an app library, a website, an ad network, and/or another location corresponding to the resources. Upon determining the connections and terms for each of the plurality of app records, the analysis system 108 may transmit app connection data 218, including the terms and, e.g., an indication of the connections, to the search system 100. As described herein, in some examples, the analysis system 108 may also store the app connection data 218 in a connection record included in the connection data store 118. As also described herein, in other examples, upon receiving the app connection data 218 from the analysis system 108, the search system 100 may store the data 218 in the corresponding one of the plurality of app records included in the search data store 112.

In block 804, (e.g., at a later point in time following the analysis system 108 generating the app connection data 218, as described with reference to block 802), the search system 100 may receive a search query 210 specified by a user from one of the user device(s) 102 (e.g., as part of a query wrapper). In block 806, the search system 100 (e.g., the query analysis module 300) may optionally perform an analysis of the search query 210. For example, the search system 100 may perform any of tokenization, filtering, stemming, synonymization, and stop word removal with respect to the search query 210. In some examples, the search system 100 may receive additional information from the user device 102 (e.g., as part of the query wrapper, or separately), such as user information and/or geo-location, platform, and IP address information associated with the device 102.

In block 808, the search system 100 (e.g., the set generation module 302) may identify a consideration set of one or more of the plurality of app records included in the search data store 112 based on the (e.g., analyzed) search query 210 and the terms determined for each identified record, as indicated by the app connection data 218. For example, the search system 100 may identify each app record based on (e.g., text) matches between terms of the search query 210 and the terms determined for the record. In some examples, the search system 100 may further identify each app record based on (e.g., text) matches between terms of the search query 210 and terms of information (e.g., AAs and/or app names/IDs) included in the record.

In some examples, the search system 100 may identify at least one of the app records of the consideration set in the manner described herein using one or more terms that have been previously determined for the record. For example, the analysis system 108 may determine the terms prior to the search system 100 receiving the search query 210 from the user device 102. As one example, the analysis system 108 may store the terms in a connection record included in the connection data store 118. As another example, the search system 100 may store the terms in the one of the plurality of app records included in the search data store 112 that corresponds to (e.g., that will be identified as) the app record of the consideration set. In these examples, upon the search system 100 receiving the search query 210 from the user device 102, the system 100 may retrieve the terms from any of these records and use the terms as described herein to identify the corresponding app record of the consideration set.

In other examples, the search system 100 may identify at least one of the app records of the consideration set using one or more terms that are dynamically generated for the record. For example, the analysis system 108 may generate the terms in response to the search system 100 receiving the search query 210 from the user device 102. In a specific example, to generate the terms for the app record, the analysis system 108 may analyze (e.g., traverse) an app connection graph (e.g., as shown in FIG. 6D), which the system 108 may have previously generated. In this example, the app connection graph may indicate the native app specified by the app record and one or more connections between the app and one or more other resources (e.g., native apps specified by other app records included in the search data store 112 and/or non-app resources). As a result of analyzing the app connection graph, the analysis system 108 may identify the connections associated with the native app and determine one or more terms associated with the resources connected with the app by the connections. Upon the analysis system 108 determining the terms for the app record, the search system 100 may use the terms as described herein to identify the record.

In blocks 810-812, the search system 100 (e.g., the set processing module 304) may optionally process the consideration set of app records. Specifically, in block 810, the search system 100 may generate one or more result scores for the app records included in the consideration set. For example, the search system 100 may generate a result score for each app record of the consideration set. In block 812, the search system 100 may select one or more app records from (e.g., select a subset of) the consideration set based on the one or more result scores associated with the selected records. For example, the search system 100 may select one or more app records of the consideration set having the highest (e.g., largest) one or more result scores.

In block 814, the search system 100 (e.g., the result generation module 114) may select one or more ADAs from the (e.g., selected) app records of the consideration set. For example, the search system 100 may select an ADA from each (e.g., selected) app record of the consideration set. In some examples, the search system 100 may also select other information from the (e.g., selected) app records of the consideration set, such as link data, result scores, and/or other data associated with the records. In block 816, the search system 100 (e.g., the result generation module 114) may generate one or more search results 220 that include the selected ADAs. For example, the search system 100 may generate the search results 220 such that each result 220 includes one of the ADAs and, e.g., the other information, selected from each (e.g., selected) app record. In block 818, the search system 100 (e.g., the result generation module 114) may transmit the search results 220, including the selected ADAs and, e.g., the selected other information, to the user device 102.

Figure 9:
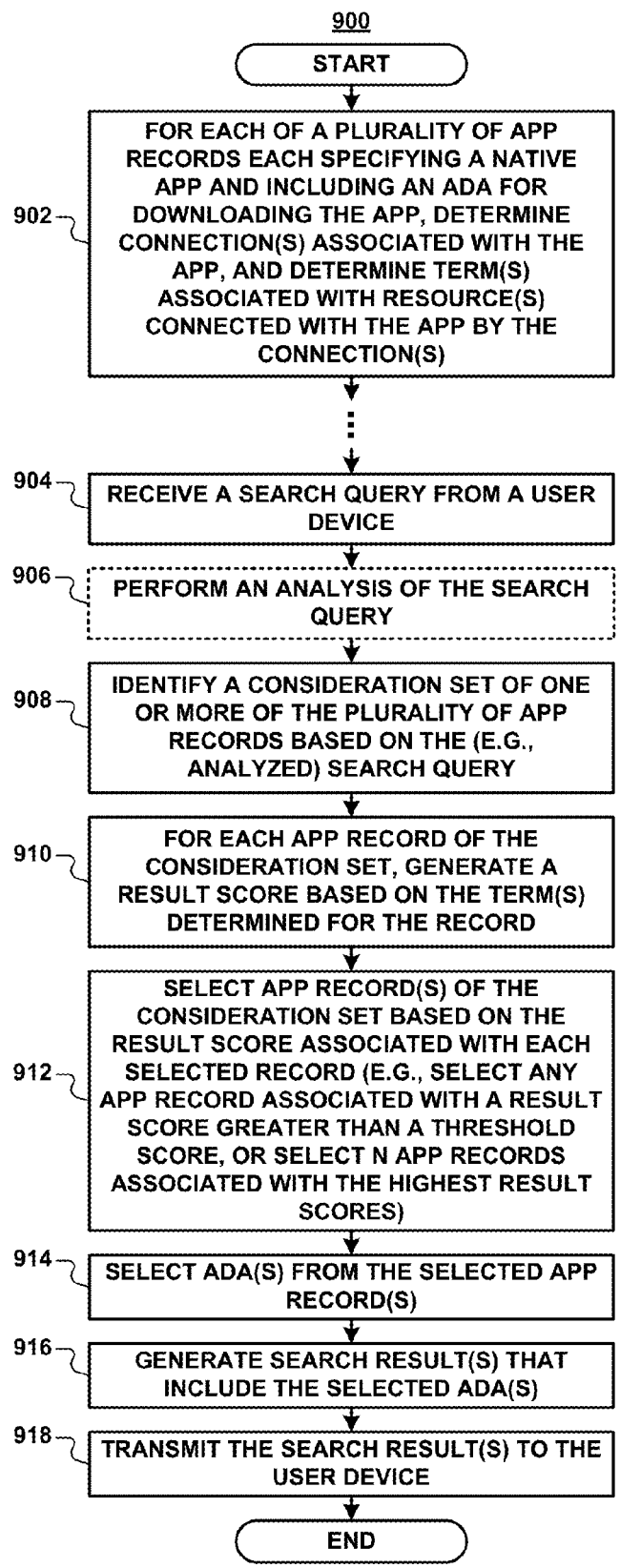

FIG. 9 is a flow diagram that illustrates another example method 900 for generating search results 220 based on a search query 210 and app connection data 218 using the search system 100. Blocks 902-906 of the method 900 are analogous to blocks 802-806 of the method 800. In block 908, the search system 100 (e.g., the set generation module 302) may identify a consideration set of one or more of the plurality of app records included in the search data store 112 based on the (e.g., analyzed) search query 210. For example, the search system 100 may identify each app record of the consideration set based on (e.g., text) matches between terms of the search query 210 and terms of information (e.g., AAs and/or app names/IDs) included in the records, in a similar manner as described with reference to the method 800.

In block 910, the search system 100 (e.g., the set processing module 304) may, for each app record of the consideration set, generate a result score based on the terms determined for the record. As described herein, to generate the result score based on the terms, the search system 100 may use the terms as one or more scoring features (e.g., along with one or more other scoring features associated with the search query 210, the app record, and/or other parameters) in conjunction with an MLR model. In some examples, the search system 100 may generate the result score for at least one of the app records of the consideration set using one or more terms that have been previously determined for the record, in a similar manner as described with reference to the method 800. In other examples, the search system 100 may generate the result score for the app record using one or more dynamically-generated terms, also in a similar manner as described with reference to the method 800.

In block 912, the search system 100 (e.g., the set processing module 304) may select one or more app records (e.g., a subset) of the consideration set based on the result score associated with each selected record. For example, the search system 100 may select any app record of the consideration set that is associated with a result score that is greater than a predetermined threshold score. Alternatively, the search system 100 may select N app records of the consideration set (e.g., where N is an integer value that is greater than 0) that are associated with the highest (e.g., largest) one or more results scores. In a specific example, the search system 100 may rank the app records of the consideration set based on the result scores associated with the records. For example, the search system 100 may arrange the app records in an order of decreasing result scores. The search system 100 may then select one or more of the arranged app records based on the order. For instance, the search system 100 may select one or more of the app records that are associated with result scores that are greater than a predetermined threshold score, or with the highest (e.g., largest) results scores.

In block 914, the search system 100 (e.g., the result generation module 114) may select one or more ADAs from the selected app records. For example, the search system 100 may select an ADA from each selected app record. In some examples, the search system 100 may also select other information from the selected app records, such as link data, result scores, and/or other data associated with the records. In block 916, the search system 100 (e.g., the result generation module 114) may generate one or more search results 220 that include the selected ADAs. For example, the search system 100 may generate the search results 220 such that each result 220 includes one of the ADAs and, e.g., the other information, selected from each selected app record. In block 918, the search system 100 (e.g., the result generation module 114) may transmit the search results 220, including the selected ADAs and, e.g., the selected other information, to the user device 102.

In some examples, the transmission of the search results 220 from the search system 100 to the user device 102, as described in the methods 800 and 900, may be intermediated by any number of other services, systems, and/or devices.

Figure 10A:
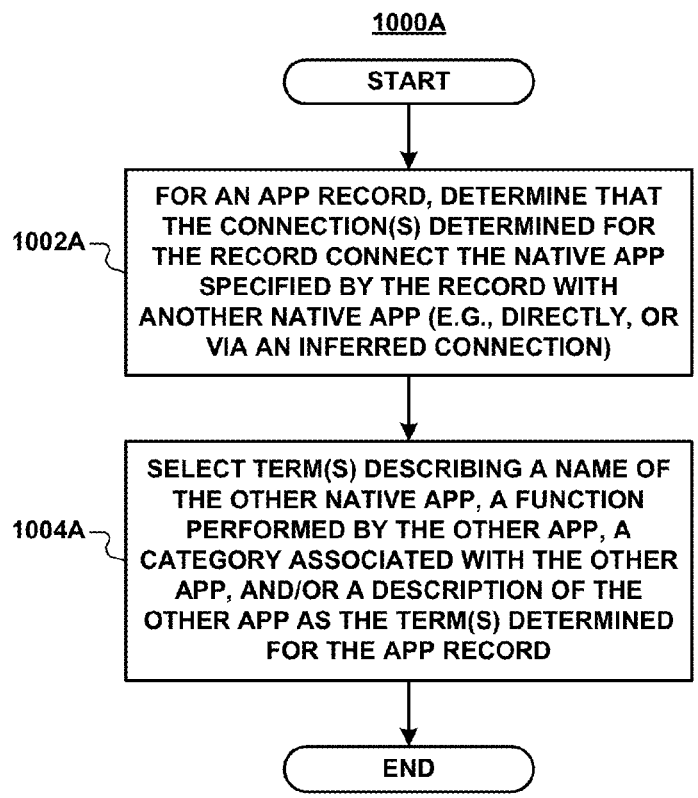
Figure 10B:
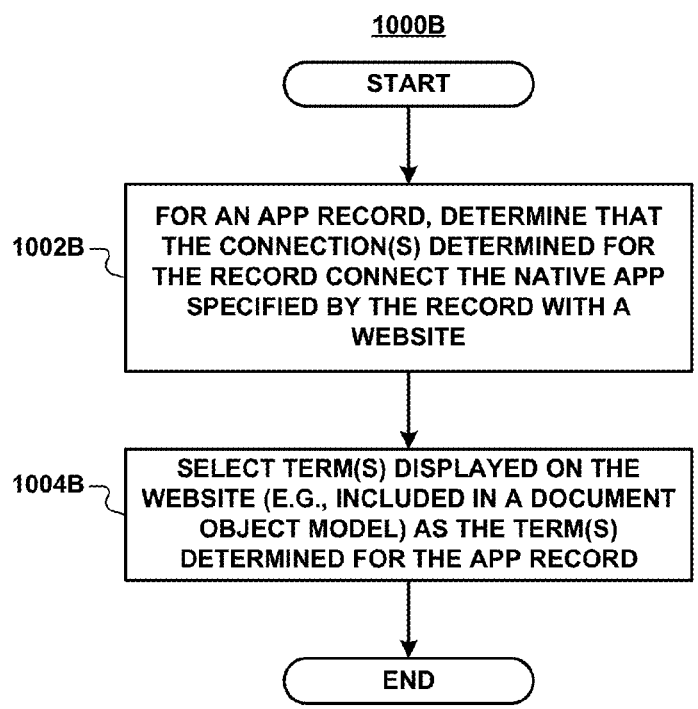
Figure 11:
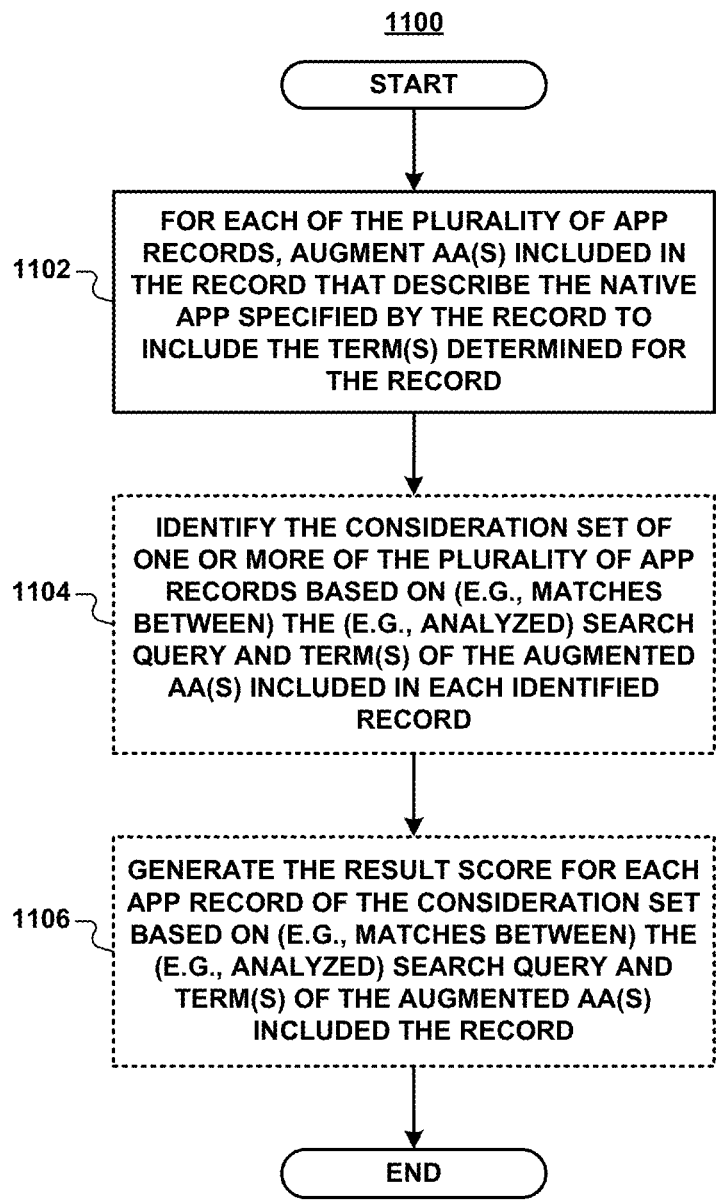

FIGS. 10A-11 are flow diagrams that each illustrate an example of a particular aspect of the methods 800 and 900 described herein relating to generating and storing app connection data 218 associated with native apps. Specifically, FIGS. 10A-10B depict example methods 1000A and 1000B, respectively, for determining one or more terms associated with a resource connected with a native app specified by an app record by a connection, as described herein with reference to blocks 802 and 902. FIG. 11, in turn, depicts an example method 1100 for storing the terms determined for the native app in the app record and subsequently identifying and/or generating a result score for (e.g., ranking) the record based on the stored terms, as described herein with reference to blocks 808 and 910.

As shown in FIG. 10A, in block 1002A, the analysis system 108 (e.g., the app term determination module 508) may initially, for an app record included in the search data store 112 (e.g., one of the plurality of app records of the methods 800 and 900), determine that the connections determined for the record connect the native app specified by the record with another native app. For example, this connection may be explicit (e.g., direct), or be inferred from another connection between the native app and an API, an app library, a website, or another resource associated with the other native app). In block 1004A, the analysis system 108 may further select one or more terms describing a name of the other native app, a function performed by the other app, a category associated with the other app, and/or a description of the other app as the terms determined for the app record. Additionally, or alternatively, as shown in block 1002B of FIG. 10B, the analysis system 108 may determine that the connections connect the native app with a website. As shown in block 1004B of FIG. 10B, the analysis system 108 may then select one or more terms displayed on (e.g., included in a document object model associated with) the website as the terms determined for the app record.

As shown in FIG. 11, in block 1102, the search system 100 (e.g., the AAs augmentation module 512) may, for each of the plurality of app records of the methods 800 and 900, augment the AAs included in the record that describe the native app specified by the record to include the terms determined for the record. In some examples, as shown in block 1104, the search system 100 (e.g., the set generation module 302) may identify the consideration set of one or more of the plurality of app records based on (e.g., matches between) the (e.g., analyzed) search query 210 and one or more terms of the augmented AAs included in each identified record. Additionally, or alternatively, in block 1106, the search system 100 (e.g., the set processing module 304) may generate the result score for each of the app records of the consideration set based on (e.g., matches between) the (e.g., analyzed) search query 210 and one or more terms of the augmented AAs included in the record.

Figure 12:
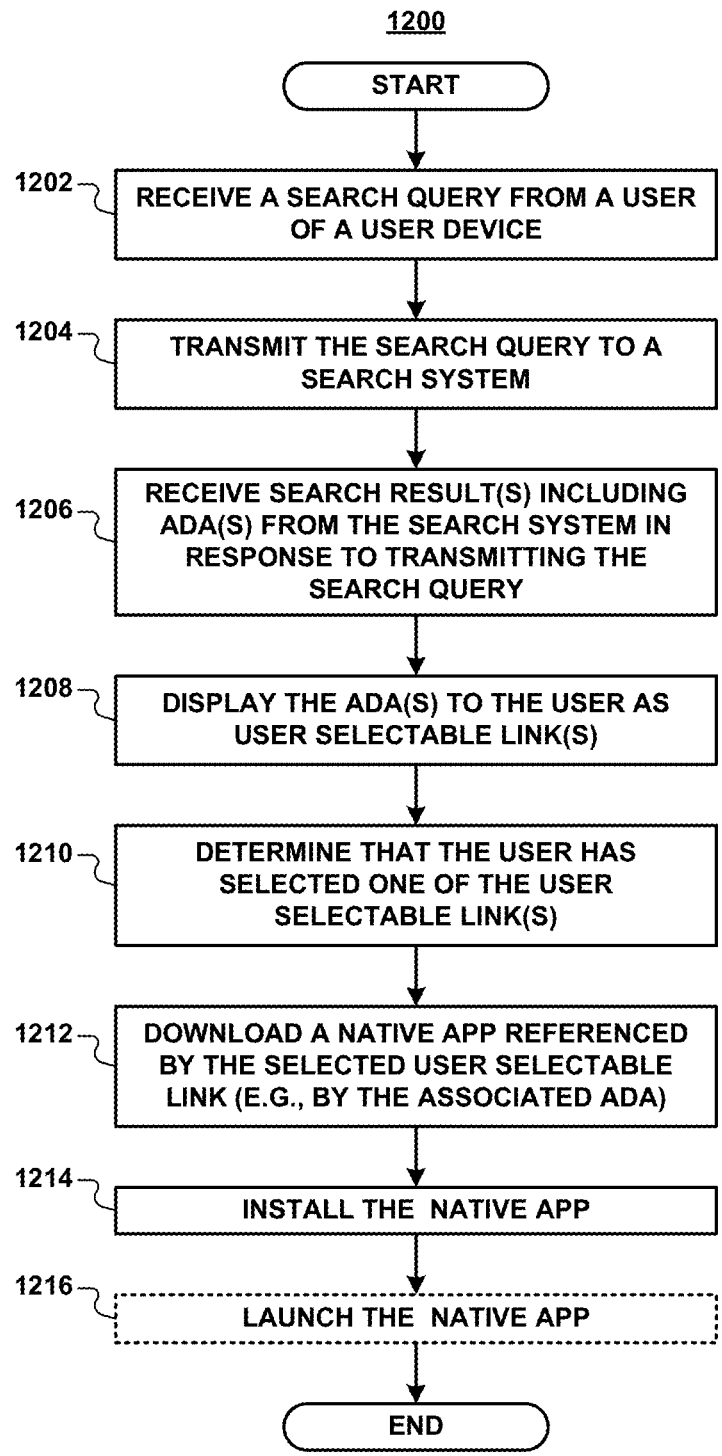
FIG. 12 is a flow diagram that illustrates an example method for generating search results based on a search query and app connection data using a user device.

FIG. 12 is a flow diagram that illustrates an example method 1200 for generating search results 220 based on a search query 210 and app connection data 218 using a user device 102. As shown in FIG. 12, in block 1202, one of the user device(s) 102 may initially receive a search query 210 from a user of the device 102. As described herein, the user device 102 may receive the search query 210 from the user via a search app 204 executing on the device 102. In block 1204, the user device 102 may transmit the search query 210 to the search system 100. As also described herein, the user device 102 may transmit the search query 210 to the search system 100 in response to receiving an input from the user via the search app 204. In this example, the search system 100 may receive the search query 210 from the user device 102 and generate one or more search results 220 based on the query 210 and app connection data 218 generated by the analysis system 108. As explained herein, the search results 220 may include one or more ADAs, link data, result scores, and/or other information. The search system 100 may then transmit the search results 220 to the user device 102.

In block 1206, the user device 102 may receive the search results 220, including the ADAs, from the search system 100 in response to transmitting the search query 210 to the system 100. In block 1208, the user device 102 may display the ADAs to the user as one or more user selectable links. As described herein, the user device 102 may display the ADAs as the user selectable links via the search app 204. For example, the user device 102 may generate each user selectable link to include one of the ADAs and, e.g., the corresponding link data and/or other information also received as part of the search results 220. In some examples, the user device 102 may further rank (e.g., arrange within an order) the user selectable links including the ADAs based on the corresponding result scores also received along with the search results 220.

In block 1210, the user device 102 may determine that the user has selected one of the user selectable links displayed to the user. In block 1212, in response to making this determination, the user device 102 may download a native app referenced by the selected user selectable link (e.g., from a digital distribution platform using the ADA included in the link) and, in block 1214, install the app on the device 102. In block 1216, upon downloading and installing the native app, the user device 102 may optionally launch the app on the device 102.

In further examples, the search system 100 may generate one or more additional search results (not shown) that include content that does not specify native apps (e.g., content related to native app states, websites, documents, and/or media files). In these examples, the search system 100 may identify one or more records (e.g., app state records, or other data structures) stored in a data store that include the content based on the search query 210, in a similar manner as described herein. The search system 100 may then select the content from the identified records and transmit the content to the user device 102 with the search results 220.

The modules and data stores included in the search system 100 and analysis system 108 represent features that may be included in these systems 100, 108 as they are described in the present disclosure. For example, the search module 110, search data store 112, and result generation module 114 may represent features included in the search system 100. Similarly, the connection determination module 116, connection data store 118, and connection record module 120 may represent features included in the analysis system 108. The modules and data stores described herein may be embodied by electronic hardware, software, and/or firmware. Depiction of different features as separate modules and data stores does not necessarily imply whether the modules and data stores are embodied by common or separate electronic hardware, software, and/or firmware components. In some implementations, the features associated with the modules and data stores depicted herein may be realized by one or more common or separate electronic hardware, software, and/or firmware components.

The modules and data stores may be embodied by electronic hardware, software, and/or firmware components including, but not limited to, one or more processing units, memory components, input/output (I/O) components, and interconnect components. The interconnect components may be configured to provide communication between the processing units, memory components, and I/O components. For example, the interconnect components may include one or more buses configured to transfer data between electronic components. The interconnect components may also include control circuits (e.g., a memory controller and/or an I/O controller) configured to control communication between electronic components.

The processing units may include one or more central processing units (CPUs), graphics processing units (GPUs), digital signal processing units (DSPs), or other processing units. The processing units may be configured to communicate with the memory components and I/O components. For example, the processing units may be configured to communicate with the memory components and I/O components via the interconnect components.

A memory component (memory) may include any volatile or non-volatile media. For example, the memory may include electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray disc), or any other memory components. The memory components may include (e.g., store) the data described herein. For example, the memory components may store the data included in the app records 400A of the search data store 112 and/or the data included in (e.g., connection records of) the connection data store 118. The memory components may also include instructions executed by the processing units. For example, the memory components may include computer-readable instructions that, when executed by the processing units, cause the units to perform the various functions attributed to the modules and data stores described herein.

The I/O components may refer to electronic hardware, software, and/or firmware that provide communication with a variety of different devices. For example, the I/O components may provide communication between other devices and the processing units and memory components. In some examples, the I/O components may be configured to communicate with a computer network. For example, the I/O components may be configured to exchange data over a computer network using a variety of different physical connections, wireless connections, and protocols. The I/O components may include network interface components (e.g., a network interface controller), repeaters, network bridges, network switches, routers, and firewalls. In some examples, the I/O components may include hardware, software, and/or firmware configured to communicate with various human interface devices, including display screens, keyboards, pointer devices (e.g., a mouse), touchscreens, speakers, and microphones. In other examples, the I/O components may include hardware, software, and/or firmware configured to communicate with additional devices, such as external memory (e.g., external HDDs).

In some examples, the search system 100 and/or analysis system 108 may be a system of one or more computing devices (e.g., a computer search system) configured to implement the techniques described herein. Put another way, the features attributed to the modules and data stores described herein may be implemented by one or more computing devices. Each computing device may include any combination of electronic hardware, software, and/or firmware described herein. For example, each computing device may include any combination of the one or more processing units, memory components, I/O components, and interconnect components described herein. The computing devices may also include various human interface devices, including display screens, keyboards, pointing devices (e.g., a mouse), touchscreens, speakers, and microphones. The computing devices may also be configured to communicate with additional devices, such as external memory (e.g., external HDDs).

The computing devices of the search system 100 and/or analysis system 108 may be configured to communicate with the network 106. The computing devices may also be configured to communicate with one another via a computer network. In some examples, the computing devices may include one or more server computing devices configured to communicate with the user device(s) 102 (e.g., receive search queries 210 and app interaction data 216, and transmit search results 220), gather data from the data source(s) 104, index the data, store the data, and store other documents. In other examples, the computing devices may reside within a single machine at a single geographic location, within multiple machines at a single geographic location, or be distributed across a number of geographic locations.

Additionally, the various implementations of the search system 100 and analysis system 108 described herein (e.g., using one or more computing devices that include one or more processing units, memory components, I/O components, and interconnect components) are equally applicable to any of the user device(s) 102, as well as to the various components thereof.

What is claimed is:

1. A method comprising:
   for each of a plurality of application (app) records each specifying an app and including an app download address (ADA) for downloading the app, determining, by an analysis system in a server, one or more connections associated with the app, and determining, by the analysis system, one or more terms associated with one or more resources connected with the app by the one or more connections;
   receiving, by a search system in the server, a search query from a user device;
   identifying, by the search system, one or more of the plurality of app records based on the search query and based on the one or more terms associated with the one or more resources connected with the app specified by the each of the plurality of app records;
   selecting, by the search system, one or more ADAs from the identified one or more of the plurality of app records; and
   transmitting, by the search system, the one or more ADAs to the user device.

2. The method of claim 1, wherein the one or more connections associated with the app specified by at least one of the plurality of app records comprise one or more of the following:
   an outbound link configured to enable the app to access another resource; or
   an inbound link configured to enable another resource to access the app.

3. The method of claim 1, wherein the one or more connections associated with the app specified by at least one of the plurality of app records comprise one or more of the following:
   a link between the app and another app;
   a link between the app and an app programming interface (API);
   an app library included in the app; or
   a link between the app and a web resource.

4. The method of claim 1, wherein determining the one or more connections associated with the app specified by at least one of the plurality of app records comprises performing a static connection analysis including identifying one or more software instructions associated with the app that cause the app to communicate with another resource.

5. The method of claim 1, wherein determining the one or more connections associated with the app specified by at least one of the plurality of app records comprises performing a dynamic connection analysis including detecting that the app is communicating with another resource.

6. The method of claim 1, wherein identifying the one or more of the plurality of app records based on the search query and based on the one or more terms associated with the at least one resource connected with the app specified by the each of the plurality of app records comprises identifying the each of the plurality of app records based on one or more matches between one or more terms of the search query and the one or more terms associated with the one or more resources connected with the app specified by the each of the plurality of app records.

7. The method of claim 1,
   wherein each of the plurality of app records further includes one or more app attributes (AAs) that describe the app,
   the method further comprising identifying the one or more of the plurality of app records based on the one or more AAs included in the each of the plurality of app records, including identifying the each of the plurality of app records based on one or more matches between one or more terms of the search query and one or more terms of the one or more AAs included in the each of the plurality of app records.

8. The method of claim 1,
   wherein each of the plurality of app records further includes one or more app attributes (AAs) that describe the app, the method further comprising, for each of the plurality of app records, augmenting the one or more AAs included in the each of the plurality of app records to include the one or more terms determined for the each of the plurality of app records, and
   wherein identifying the one or more of the plurality of app records based on the search query and based on the one or more terms associated with the one or more resources connected with the app specified by the each of the plurality of app records comprises identifying the each of the plurality of app records based on one or more matches between one or more terms of the search query and one or more terms of the augmented one or more AAs included in the each of the plurality of app records.

9. The method of claim 1,
   wherein each of the plurality of app records further includes one or more app attributes (AAs) that describe the app,
   wherein, for at least one of the plurality of app records, the one or more connections determined for an app record of the plurality of app records connect the app specified by the app record of the plurality of app records with another app specified by another one of the plurality of app records, and
   wherein determining the one or more terms for the app record comprises selecting one or more terms of the one or more AAs included in the other one of the plurality of app records as the one or more terms associated with the one or more resources connected with the app specified by the each of the plurality of app records.

10. The method of claim 1,
    wherein, for at least one of the plurality of app records, the one or more connections determined for an app record of the plurality of app records connect the app specified by the app record of the plurality of app records with another app, and
    wherein determining the one or more terms for the app record of the plurality of app records comprises selecting one or more terms describing one or more of the following as the one or more terms associated with the one or more resources connected with the app specified by the each of the plurality of app records:
    a name of the other app;
    a function performed by the other app;
    a category associated with the other app; or
    a description of the other app.

11. The method of claim 1,
wherein, for at least one of the plurality of app records, the one or more connections determined for an app record of the plurality of app records connect the app specified by the app record of the plurality of app records with a website, and wherein determining the one or more terms for the app record of the plurality of app records comprises selecting one or more terms displayed on the website as the one or more terms associated with the at least one resource connected with the app specified by the each of the plurality of app records.

12. A method comprising:
for each of a plurality of application (app) records each specifying an app and including an app download address (ADA) for downloading the app, determining, by an analysis system in a server, one or more connections associated with the app, and determining, by the analysis system, one or more terms associated with one or more resources connected with the app by the one or more connections;

receiving, by a search system in the server, a search query from a user device;

identifying, by the search system, one or more of the plurality of app records based on the search query;

for each of the identified one or more of the plurality of app records, generating, by the search system, a result score based on one or more terms associated with at least one resource connected with an app specified by the identified one or more of the plurality of app records;

selecting, by the search system, one or more app records from the identified one or more of the plurality of app records based on the generated result score;

selecting, by the search system, the one or more ADAs from the selected one or more app records; and transmitting, by the search system, the one or more ADAs to the user device.

13. The method of claim 12, wherein the one or more connections associated with the app specified by at least one of the plurality of app records comprise one or more of the following:
an outbound link configured to enable the app to access another resource;
an inbound link configured to enable another resource to access the app;
a link between the app and another app;
a link between the app and an app programming interface (API);
an app library included in the app; or
a link between the app and a web resource.

14. The method of claim 12, wherein determining the one or more connections associated with the app specified by at least one of the plurality of app records comprises performing one or more of a static connection analysis including identifying one or more software instructions associated with the app that cause the app to communicate with another resource, or a dynamic connection analysis including detecting that the app is communicating with another resource.

15. The method of claim 12, wherein generating the result score for at least one of the identified one or more of the plurality of app records based on the one or more terms associated with the one or more resources connected with the app specified by the identified one or more of the plurality of app records comprises generating the result score based on one or more matches between one or more terms of the search query and the one or more terms associated with the one or more resources connected with the app specified by the identified one or more of the plurality of app records.

16. The method of claim 12, wherein generating the result score for at least one of the identified one or more of the plurality of app records based on the one or more terms associated with the one or more resources connected with the app specified by the identified one or more of the plurality of app records comprises generating the result score using the one or more terms as one or more scoring features input into a machine-learned relevance (MLR) model.

17. The method of claim 12,
wherein each of the plurality of app records further includes one or more app attributes (AAs) that describe the app, the method further comprising, for each of the plurality of app records, augmenting the one or more AAs included in the each of the plurality of app records to include the one or more terms determined for the each of the plurality of app records, and wherein generating the result score for each of the identified one or more of the plurality of app records based on the one or more terms associated with the one or more resources connected with the app specified by the identified one or more of the plurality of app records comprises generating the result score based on one or more matches between one or more terms of the search query and one or more terms of the augmented one or more AAs included in the each of the plurality of app records.

18. The method of claim 12,
wherein each of the plurality of app records further includes one or more app attributes (AAs) that describe the app, and wherein identifying the one or more of the plurality of app records based on the search query comprises identifying each record based on one or more matches between one or more terms of the search query and one or more terms of the one or more AAs included in the identified one or more of the plurality of app records.

19. A system comprising one or more computing devices configured to:
for each of a plurality of application (app) records each specifying an app and including an app download address (ADA) for downloading the app, determine one or more connections associated with the app, and determine one or more terms associated with one or more resources connected with the app by the one or more connections;

receive a search query from a user device;

identify one or more of the plurality of app records based on the search query and based on the one or more terms associated with the one or more resources connected with the app specified by the each of the plurality of app records;

select the one or more ADAs from the identified one or more of the plurality of app records; and transmit the one or more ADAs to the user device.

20. A system comprising one or more computing devices configured to:
for each of a plurality of application (app) records each specifying an app and including an app download address (ADA) for downloading the app, determine one or more connections associated with the app, and determine one or more terms associated with one or more resources connected with the app by the one or more connections;

receive a search query from a user device;

identify one or more of the plurality of app records based on the search query;

for each of the identified one or more of the plurality of app records, generate a result score based on one or more terms associated with at least one resource connected with an app specified by the identified one or more of the plurality of app records;

select one or more app records from the identified one or more of the plurality of app records based on the generated result score;

select the one or more ADAs from the selected one or more app records; and transmit the one or more ADAs to the user device.

* * * * *